US012573396B2

(12) United States Patent
Qi et al.

(10) Patent No.: US 12,573,396 B2
(45) Date of Patent: Mar. 10, 2026

(54) METHOD FOR INTERACTION BETWEEN MOBILE TERMINAL AND IN-VEHICLE TERMINAL, TERMINAL, AND SYSTEM

(71) Applicant: HUAWEI TECHNOLOGIES CO., LTD., Shenzhen (CN)

(72) Inventors: Qi Qi, Lund (SE); Guanhua Wang, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 173 days.

(21) Appl. No.: 18/357,903

(22) Filed: Jul. 24, 2023

(65) Prior Publication Data

US 2023/0410809 A1    Dec. 21, 2023

Related U.S. Application Data

(63) Continuation of application No. PCT/CN2021/142124, filed on Dec. 28, 2021.

(30) Foreign Application Priority Data

Jan. 25, 2021    (CN) .......................... 202110100031.4

(51) Int. Cl.
*G10L 15/22* (2006.01)
*H04W 76/14* (2018.01)

(52) U.S. Cl.
CPC ............. *G10L 15/22* (2013.01); *H04W 76/14* (2018.02); *G10L 2015/223* (2013.01)

(58) Field of Classification Search
CPC .. G10L 15/22; G10L 2015/223; H04W 76/14; H04W 4/029; H04W 4/80;
(Continued)

(56) References Cited

U.S. PATENT DOCUMENTS

2015/0163854 A1* 6/2015 Lee .......................... H04W 4/80
370/328
2016/0240169 A1* 8/2016 Tamura ................. G06F 3/1423
(Continued)

FOREIGN PATENT DOCUMENTS

CN      102795173 A    11/2012
CN      103425494 A    12/2013
(Continued)

*Primary Examiner* — Aniss Chad
*Assistant Examiner* — Christine Nguyen Hyunh
(74) *Attorney, Agent, or Firm* — Leydig, Voit & Mayer, Ltd.

(57) ABSTRACT

A method for interaction between a mobile terminal and an in-vehicle terminal, a related terminal, and a related system are provided. When a user command from an in-vehicle terminal is received, software and hardware of the in-vehicle terminal may be automatically invoked based on the user command to obtain information. The method includes: a mobile terminal receives first information sent by an in-vehicle terminal, wherein the first information indicates to execute a first function. The mobile terminal determines a first indication based on the first information, and sends the first indication to the in-vehicle terminal, wherein the first indication indicates the in-vehicle terminal to obtain second information. The mobile terminal receives the second information sent by the in-vehicle terminal. The mobile terminal executes the first function based on the second information.

20 Claims, 10 Drawing Sheets

(58) Field of Classification Search
CPC ........... H04W 4/44; H04W 4/12; H04W 4/48;
H04W 4/02; H04L 67/125; H04L 67/06;
H04M 1/724098; H04M 1/72415
See application file for complete search history.

(56) References Cited

U.S. PATENT DOCUMENTS

| | | | |
|---|---|---|---|
| 2016/0284217 A1 | 9/2016 | Lee et al. | |
| 2019/0186941 A1 | 6/2019 | Cho et al. | |
| 2020/0053526 A1* | 2/2020 | Ujiie ..................... | G08G 1/162 |
| 2021/0374414 A1* | 12/2021 | Wilkosz ................ | G06V 20/35 |

FOREIGN PATENT DOCUMENTS

| | | | |
|---|---|---|---|
| CN | 105606114 A | 5/2016 |
| CN | 110620904 A | 12/2019 |
| CN | 110769394 A | 2/2020 |
| CN | 112954648 A | 6/2021 |
| EP | 3247170 A1 | 11/2017 |

\* cited by examiner

Mobile terminal 100

(1)

8:00

Sharing a real-time location with Jack

R&D center (2)

METHOD FOR INTERACTION BETWEEN MOBILE TERMINAL AND IN-VEHICLE TERMINAL, TERMINAL, AND SYSTEM

CROSS-REFERENCE TO RELATED APPLICATIONS

This disclosure is a continuation of International Application No. PCT/CN2021/142124, filed on Dec. 28, 2021, which claims priority to Chinese Patent Application No. 202110100031.4, filed on Jan. 25, 2021. The disclosures of the aforementioned applications are hereby incorporated by reference in their entireties.

TECHNICAL FIELD

Embodiments of this disclosure relate to the field of terminals, and in particular, to a method for interaction between a mobile terminal and an in-vehicle terminal, a terminal, and a system.

BACKGROUND

An in-vehicle terminal mounted in a vehicle may be configured to control hardware of the vehicle, for example, play a reversing camera video, control an in-vehicle air conditioner, open a window, and implement entertainment functions such as music playing and radio broadcasting. With rapid development of mobile terminal technologies, the in-vehicle terminal may also be connected to a mobile terminal to use some applications on the mobile terminal. For example, the mobile terminal may receive a music play indication sent by the in-vehicle terminal, and send music of the mobile terminal to the in-vehicle terminal, so that the in-vehicle terminal plays the music. For another example, the mobile terminal may send, to the in-vehicle terminal, a notification indicating that new information is received. After the in-vehicle terminal receives an indication that the new information is viewed by a user or played in a form of voice, the mobile terminal sends content of the new information to the in-vehicle terminal, and the in-vehicle terminal displays the content or converts the content into voice.

In a conventional technology, a mobile terminal directly executes a user command from an in-vehicle terminal, and feeds back an execution result to the in-vehicle terminal. In this case, the user command is generally a command for executing a simple task. If the user wants to execute a complex task, the user needs to split the complex task into a plurality of commands, and then send the plurality of commands to the mobile terminal through the in-vehicle terminal, and the mobile terminal separately executes the plurality of commands. It can be learned that an interaction operation between the user and the in-vehicle terminal is complex, interaction efficiency is low, and user experience is poor.

SUMMARY

This disclosure provides a method for interaction between a mobile terminal and an in-vehicle terminal, a terminal, and a system. When receiving a user command from an in-vehicle terminal, a mobile terminal may automatically invoke software and hardware of the in-vehicle terminal based on the user command to obtain information. This reduces a quantity of times of interaction between a user and the in-vehicle terminal, and improves interaction efficiency.

To achieve the foregoing objectives, embodiments of this disclosure provide the following technical solutions.

According to a first aspect, a method for interaction between a mobile terminal and an in-vehicle terminal is provided. The method is applied to a mobile terminal. The mobile terminal establishes a communication connection to an in-vehicle terminal. The method includes: The mobile terminal receives first information sent by the in-vehicle terminal, where the first information indicates to execute a first function. The mobile terminal determines a first indication based on the first information, and sends the first indication to the in-vehicle terminal, where the first indication indicates the in-vehicle terminal to obtain second information. The mobile terminal receives the second information sent by the in-vehicle terminal. The mobile terminal executes the first function based on the second information.

In other words, after receiving a user command (namely, the first information, which may be a complex user command) of the in-vehicle terminal, the mobile terminal may automatically analyze the user command. When it is determined that a software apparatus or a hardware apparatus of the in-vehicle terminal needs to be invoked to collect information (namely, the second information), the mobile terminal may automatically send a collection indication (namely, the first indication) to the in-vehicle terminal, and complete execution of the user command after obtaining corresponding information. It can be learned that the mobile terminal analyzes a complex command, performs intelligent interaction with the in-vehicle terminal, and invokes software and hardware apparatuses of the in-vehicle terminal to collect information, to cooperate to satisfy a deep intention of the user. In addition, because the interaction method does not additionally increase a quantity of times of interaction between the in-vehicle terminal and the user, distraction of the user is avoided. This ensures driving safety.

In addition, in this disclosure, because the mobile terminal analyzes a complex user command and performs intelligent interaction with the in-vehicle terminal, there is no rigid requirement on a processor of the in-vehicle terminal. Therefore, this disclosure may be applied to interaction between most in-vehicle terminals and mobile terminals, and has a wide application scope. In addition, generally, an update cycle of an in-vehicle terminal is longer (an update cycle of an automobile is long), an update cycle of a mobile terminal is shorter, and a processing capability of the mobile terminal is stronger. Therefore, the mobile terminal analyzes a complex user command, to help a vehicle that is not intelligent enough to be intelligent.

In a possible implementation, after the mobile terminal executes the first function based on the second information, the method further includes: the mobile terminal sends an execution result of the first function to the in-vehicle terminal. Therefore, the in-vehicle terminal may notify a user of the execution result of the first function by playing audio by using a display interface of a display, an audio play apparatus, or the like.

In a possible implementation, that the mobile terminal determines a first indication based on the first information specifically includes: the mobile terminal recognizes an intention corresponding to the first information. The mobile terminal determines the second information based on the intention, where the second information is information that needs to be obtained by the in-vehicle terminal. The mobile terminal determines the first indication based on the second information.

The first indication indicates the software and hardware apparatuses (namely, the software apparatus and/or the hardware apparatus) of the in-vehicle terminal to collect corresponding information (namely, the second information). The software and hardware apparatuses of the in-vehicle terminal include, for example, a camera, a positioning apparatus, an air conditioning system, a lighting system, a sensor (for example, an acceleration sensor, an ambient light sensor, or a rainfall sensor), a car audio, and software (for example, a map or a player) that has been installed on the in-vehicle terminal.

In a possible implementation, the first information indicates to send location information of a first user, the second information is location information of the in-vehicle terminal, and the first indication indicates to invoke a positioning apparatus of the in-vehicle terminal to obtain the location information of the in-vehicle terminal, or invoke positioning software of the in-vehicle terminal to obtain the location information of the in-vehicle terminal. That the mobile terminal executes the first function based on the second information is specifically: The mobile terminal invokes communication software of the mobile terminal to send the location information of the in-vehicle terminal to a terminal of a second user.

In some examples, if the mobile terminal detects that the mobile terminal is connected to the in-vehicle terminal and a specific application (for example, a HiCar application) is enabled, the mobile terminal preferentially obtains a location of a vehicle from the in-vehicle terminal by default. Alternatively, if the user command that the mobile terminal needs to collect the location information is sent by the in-vehicle terminal, the location of the vehicle is also obtained from the in-vehicle terminal by default.

Therefore, an application scenario to which the solutions of this disclosure are applicable is provided. To be specific, a user may share, with another person through the mobile terminal, a current location collected by the in-vehicle terminal, or share location information with another person in real time.

In a possible implementation, the first information indicates to share a photo or a video, the second information is a photo or a video taken by the in-vehicle terminal, and the first indication indicates to invoke a camera of the in-vehicle terminal to take the photo or the video. That the mobile terminal executes the first function based on the second information is specifically: The mobile terminal invokes communication software or short video software of the mobile terminal to share the photo or the video taken by the camera of the in-vehicle terminal.

Therefore, another application scenario to which the solutions of this disclosure are applicable is provided. To be specific, a user may share a scenery or a thing (for example, a beautiful natural scenery or an interesting thing) in front of a vehicle with another user, or notify a friend of a traffic anomaly (such as an accident, a traffic jam, surface gathered water, or a collapse) by using the photo or the video.

In a possible implementation, that the mobile terminal determines a first indication based on the first information further includes: the mobile terminal determines, based on orientation information in the first information, a camera of the in-vehicle terminal corresponding to the orientation information to take the photo or the video.

In other words, when the in-vehicle terminal includes a plurality of cameras, the mobile terminal may further automatically determine, based on the orientation information in the first information, to invoke one or more cameras corresponding to the orientation information in the plurality of cameras of the in-vehicle terminal to take photos or videos.

In a possible implementation, when the in-vehicle terminal includes a plurality of cameras, that the mobile terminal executes the first function based on the second information further includes: The mobile terminal clips photos or videos captured by the plurality of cameras of the in-vehicle terminal, and shares a clipped photo or video by using the communication software or short video software of the mobile terminal.

In other words, when the in-vehicle terminal includes the plurality of cameras, the mobile terminal may clip the photos or videos taken by the plurality of cameras to obtain the clipped photo or video, and share the clipped photo or video with another user. A specific clipping method is not limited in this disclosure.

In a possible implementation, the first information indicates to report a violation, the second information is a photo or a video taken by the in-vehicle terminal, and the first indication indicates to invoke a camera of the in-vehicle terminal to take the photo or the video. That the mobile terminal executes the first function based on the second information is specifically: The mobile terminal determines, based on the photo or the video taken by the camera of the in-vehicle terminal, whether a violation event exists; and when determining that the violation event exists, invokes traffic reporting software of the mobile terminal to report the violation event; or when determining that no violation event exists, sends a message to the in-vehicle terminal, where the message notifies that no violation event exists.

Therefore, another application scenario to which the solutions of this disclosure are applicable is provided. To be specific, a user may report a traffic violation event around a vehicle through the mobile terminal. The mobile terminal may perform image analysis on the photo or the video taken by the in-vehicle terminal, to determine whether a violation event exists. For example, the mobile terminal analyzes a vehicle speed, a vehicle location, a road indication line, a traffic light status, a driver status, and the like in the photo/video, to determine whether a violation of a vehicle or a driver exists in the photo/video.

When it is determined that the violation of the vehicle or the driver exists (in other words, a violation event is determined), the mobile terminal determines to invoke the traffic reporting software to report the violation event. When it is determined that no violation of the vehicle or the driver exists (in other words, no violation event is determined), the mobile terminal determines not to invoke the traffic reporting software to report, and may display prompt information or play voice by using the in-vehicle terminal, and notify the user that no violation event exists.

In a possible implementation, that the mobile terminal determines a first indication based on the first information further includes: the mobile terminal determines, based on orientation information in the first information, a camera of the in-vehicle terminal corresponding to the orientation information to take the photo or the video.

In a possible implementation, the first information indicates to share at least one hardware parameter of the in-vehicle terminal with a second user, the second information is a hardware parameter of the in-vehicle terminal, and the first indication indicates to read the hardware parameter of the in-vehicle terminal. That the mobile terminal executes the first function based on the second information is specifically: the mobile terminal invokes communication software of the mobile terminal to share the hardware parameter of the in-vehicle terminal.

In a possible implementation, the hardware parameter of the in-vehicle terminal includes one or more of a mode of an air conditioner, a temperature of the air conditioner, a control parameter of an atmosphere light, and a setting parameter of a car audio.

According to a second aspect, a method for interaction between a mobile terminal and an in-vehicle terminal is provided. The method is applied to an in-vehicle terminal. The in-vehicle terminal establishes a communication connection to a mobile terminal. The method includes: The in-vehicle terminal receives a first input of a first user, where the first input indicates to execute a first function. The in-vehicle terminal sends first information corresponding to the first input to the mobile terminal. The in-vehicle terminal receives a first indication sent by the mobile terminal, where the first indication is determined by the mobile terminal based on the first information; and the in-vehicle terminal obtains second information based on the first indication. The in-vehicle terminal sends the second information to the mobile terminal, where the second information is used by the mobile terminal to execute the first function.

In a possible implementation, after the mobile terminal executes the first function, the method further includes: The in-vehicle terminal receives an execution result of the first function sent by the mobile terminal, and displays a second interface or plays voice based on the execution result of the first function.

In a possible implementation, the first input includes any one of a voice command input by the first user, an operation performed by the first user on a touchscreen of the in-vehicle terminal, and an operation performed by the first user on a button of the in-vehicle terminal.

In a possible implementation, the first input indicates to send location information of the first user, the second information is location information of the in-vehicle terminal, and the first indication indicates to invoke a positioning apparatus of the in-vehicle terminal to obtain the location information of the in-vehicle terminal, or invoke positioning software of the in-vehicle terminal to obtain the location information of the in-vehicle terminal.

In a possible implementation, the first input indicates to share a photo or a video or report a violation, the second information is a photo or a video taken by the in-vehicle terminal, and the first indication indicates to invoke a camera of the in-vehicle terminal to take the photo or the video.

In a possible implementation, the first input indicates to share at least one hardware parameter of the in-vehicle terminal with a second user, the second information is a hardware parameter of the in-vehicle terminal, and the first indication indicates to read the hardware parameter of the in-vehicle terminal.

In a possible implementation, the hardware parameter of the in-vehicle terminal includes one or more of a mode of an air conditioner, a temperature of the air conditioner, a control parameter of an atmosphere light, and a setting parameter of a car audio.

According to a third aspect, a mobile terminal is provided, including a processor, a memory, and a display. The memory and the display are coupled to the processor. The memory is configured to store computer program code. The computer program code includes computer instructions. When the processor reads the computer instructions from the memory, the mobile terminal is enabled to perform the following operations: receiving first information sent by an in-vehicle terminal, where the first information indicates to execute a first function; determining a first indication based on the first information, and sending the first indication to the in-vehicle terminal, where the first indication indicates the in-vehicle terminal to obtain second information; receiving the second information sent by the in-vehicle terminal; and executing the first function based on the second information.

In a possible implementation, the mobile terminal further performs the following operation: after the performing the first function based on the second information, sending an execution result of the first function to the in-vehicle terminal.

In a possible implementation, the determining a first indication based on the first information specifically includes: recognizing an intention corresponding to the first information; determining the second information based on the intention, where the second information is information that needs to be obtained by the in-vehicle terminal; and determining the first indication based on the second information.

In a possible implementation, the first information indicates to send location information of a first user, the second information is location information of the in-vehicle terminal, and the first indication indicates to invoke a positioning apparatus of the in-vehicle terminal to obtain the location information of the in-vehicle terminal, or invoke positioning software of the in-vehicle terminal to obtain the location information of the in-vehicle terminal. The executing the first function based on the second information is specifically: invoking communication software of the mobile terminal to send the location information of the in-vehicle terminal to a terminal of a second user.

In a possible implementation, the first information indicates to share a photo or a video, the second information is a photo or a video taken by the in-vehicle terminal, and the first indication indicates to invoke a camera of the in-vehicle terminal to take the photo or the video. The executing the first function based on the second information is specifically: invoking communication software or short video software of the mobile terminal to share the photo or the video taken by the camera of the in-vehicle terminal.

In a possible implementation, the determining a first indication based on the first information further includes: determining, based on orientation information in the first information, a camera of the in-vehicle terminal corresponding to the orientation information to take the photo or the video.

In a possible implementation, when the in-vehicle terminal includes a plurality of cameras, the executing the first function based on the second information further includes: clipping photos or videos captured by the plurality of cameras of the in-vehicle terminal, and sharing a clipped photo or video by using the communication software or short video software of the mobile terminal.

In a possible implementation, the first information indicates to report a violation, the second information is a photo or a video taken by the in-vehicle terminal, and the first indication indicates to invoke a camera of the in-vehicle terminal to take the photo or the video. The executing the first function based on the second information is specifically: determining, based on the photo or the video taken by the camera of the in-vehicle terminal, whether a violation event exists; and when determining that the violation event exists, invoking traffic reporting software of the mobile terminal to report the violation event; or when determining that no violation event exists, sending a message to the in-vehicle terminal, where the message notifies that no violation event exists.

In a possible implementation, the determining a first indication based on the first information further includes: determining, based on orientation information in the first information, a camera of the in-vehicle terminal corresponding to the orientation information to take the photo or the video.

In a possible implementation, the first information indicates to share at least one hardware parameter of the in-vehicle terminal with a second user, the second information is a hardware parameter of the in-vehicle terminal, and the first indication indicates to read the hardware parameter of the in-vehicle terminal. The executing the first function based on the second information is specifically: invoking communication software of the mobile terminal to share the hardware parameter of the in-vehicle terminal.

In a possible implementation, the hardware parameter of the in-vehicle terminal includes one or more of a mode of an air conditioner, a temperature of the air conditioner, a control parameter of an atmosphere light, and a setting parameter of a car audio.

According to a fourth aspect, an in-vehicle terminal is provided, including a processor, a memory, and a display. The memory and the display are coupled to the processor. The memory is configured to store computer program code. The computer program code includes computer instructions. When the processor reads the computer instructions from the memory, the in-vehicle terminal is enabled to perform the following operations: receiving a first input of a first user, where the first input indicates to execute a first function; sending first information corresponding to the first input to a mobile terminal; receiving a first indication sent by the mobile terminal, where the first indication is determined by the mobile terminal based on the first information; and obtaining second information based on the first indication; and sending the second information to the mobile terminal, where the second information is used by the mobile terminal to execute the first function.

In a possible implementation, the in-vehicle terminal further performs the following operations: after the mobile terminal executes the first function, receiving an execution result of the first function sent by the mobile terminal, and displaying a second interface or playing voice based on the execution result of the first function.

In a possible implementation, the first input includes any one of a voice command input by the first user, an operation performed by the first user on a touchscreen of the in-vehicle terminal, and an operation performed by the first user on a button of the in-vehicle terminal.

In a possible implementation, the first input indicates to send location information of the first user, the second information is location information of the in-vehicle terminal, and the first indication indicates to invoke a positioning apparatus of the in-vehicle terminal to obtain the location information of the in-vehicle terminal, or invoke positioning software of the in-vehicle terminal to obtain the location information of the in-vehicle terminal.

In a possible implementation, the first input indicates to share a photo or a video or report a violation, the second information is a photo or a video taken by the in-vehicle terminal, and the first indication indicates to invoke a camera of the in-vehicle terminal to take the photo or the video.

In a possible implementation, the first input indicates to share at least one hardware parameter of the in-vehicle terminal with a second user, the second information is a hardware parameter of the in-vehicle terminal, and the first indication indicates to read the hardware parameter of the in-vehicle terminal.

In a possible implementation, the hardware parameter of the in-vehicle terminal includes one or more of a mode of an air conditioner, a temperature of the air conditioner, a control parameter of an atmosphere light, and a setting parameter of a car audio.

According to a fifth aspect, an apparatus is provided. The apparatus is included in a mobile terminal, and the apparatus has a function of implementing behavior of the mobile terminal in any method according to the foregoing aspects and the possible implementations. The function may be implemented by hardware or may be implemented by hardware by executing corresponding software. The hardware or the software includes at least one module or unit corresponding to the foregoing function, for example, a receiving module or unit and a processing module or unit.

According to a sixth aspect, an apparatus is provided. The apparatus is included in an in-vehicle terminal, and the apparatus has a function of implementing behavior of the in-vehicle terminal in any method according to the foregoing aspects and the possible implementations. The function may be implemented by hardware or may be implemented by hardware by executing corresponding software. The hardware or the software includes at least one module or unit corresponding to the foregoing function, for example, a receiving module or unit, a processing module or unit, and an output module or unit.

According to a seventh aspect, a computer-readable storage medium is provided, including computer instructions. When the computer instructions are run on a mobile terminal, the mobile terminal is enabled to perform the method according to any one of the foregoing aspects and the possible implementations of the foregoing aspects.

According to an eighth aspect, a computer-readable storage medium is provided, including computer instructions. When the computer instructions are run on an in-vehicle terminal, the in-vehicle terminal is enabled to perform the method according to any one of the foregoing aspects and the possible implementations of the foregoing aspects.

According to a ninth aspect, a computer program product is provided. When the computer program product is run on a computer, the computer is enabled to perform the method according to any one of the first aspect and the possible implementations of the first aspect. According to a tenth aspect, a computer program product is provided. When the computer program product is run on a computer, the computer is enabled to perform the method according to any one of the second aspect and the possible implementations of the second aspect.

According to an eleventh aspect, a communication system is provided, including the mobile terminal according to any one of the third aspect and the possible implementations of the third aspect, and the in-vehicle terminal according to any one of the fourth aspect and the possible implementations of the fourth aspect.

The in-vehicle terminal, the mobile terminal, the apparatus, the computer storage medium, the computer program product, and the communication system provided in embodiments of this disclosure each are configured to perform the corresponding method provided above. Therefore, for beneficial effects that can be achieved by the in-vehicle terminal, the mobile terminal, the apparatus, the computer storage medium, the computer program product, and the communication system, refer to the beneficial effects in the corresponding method provided above. Details are not described herein again.

DESCRIPTION OF EMBODIMENTS

In the descriptions of embodiments of this disclosure, the word such as "example" or "for example" is used to represent giving an example, an illustration, or a description. Any embodiment or design scheme described as "example" or "for example" in embodiments of this disclosure should not be explained as being more preferred or having more advantages than another embodiment or design scheme. Exactly, use of the word "example", "for example", or the like is intended to present a related concept in a specific manner.

In the descriptions of embodiments of this disclosure, "I" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of a quantity of indicated technical features. Therefore, a feature limited by "first" or "second" may explicitly indicate or implicitly include one or more such features. In the descriptions of the embodiments of this disclosure, unless otherwise stated, "a plurality of" means two or more than two.

The following describes in detail the technical solutions provided in this disclosure with reference to the accompanying drawings.

Figure 1:
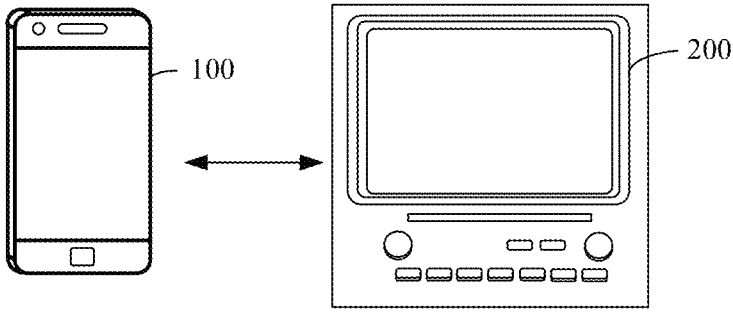
FIG. 1 is a schematic diagram of an architecture of a communication system according to an embodiment of this disclosure.

FIG. 1 is a schematic diagram of a structure of a communication system according to an embodiment of this disclosure. An interaction method provided in this embodiment of this disclosure may be applied to the communication system. Specifically, the communication system includes a mobile terminal 100 and an in-vehicle terminal 200.

The mobile terminal 100 and the in-vehicle terminal 200 may establish a communication connection in a wired or wireless manner. For example, the in-vehicle terminal 200 may establish a wired connection to the mobile terminal 100 through an interface (for example, a USB interface) by using a line. For another example, the in-vehicle terminal 200 may alternatively establish a wireless connection to the mobile terminal 100 through a wireless communication module (for example, Bluetooth or a WLAN).

For example, the mobile terminal 100 may be, for example, a mobile phone, a tablet computer, a personal computer (PC), a personal digital assistant (PDA), a smartwatch, a netbook, or a wearable electronic device. A specific form of the mobile terminal 100 is not specially limited in this disclosure.

Figure 2:
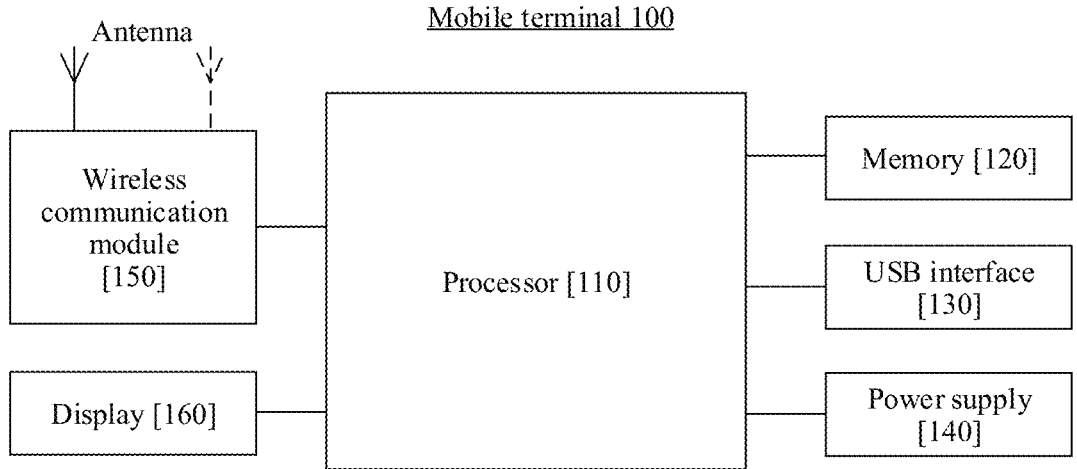
FIG. 2 is a schematic diagram of a structure of a mobile terminal according to an embodiment of this disclosure.

FIG. 2 is a schematic diagram of a hardware structure of a mobile terminal 100.

The mobile terminal 100 may include a processor 110, a memory 120, a universal serial bus (USB) interface 130, a power supply 140, an antenna, a wireless communication module 150, a display 160, and the like. It may be understood that the structure shown in this embodiment of the present invention does not constitute a specific limitation on the mobile terminal 100. In some other embodiments of this disclosure, the mobile terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), and/or a neural-network processing unit (NPU). Different processing units may be independent components, or may be integrated into one or more processors.

The memory 120 may be configured to store computer-executable program code. The executable program code includes instructions. The memory 120 may include a program storage area and a data storage area. The program storage area may store an operating system, an application required by at least one function (for example, a sound playing function or an image playing function), and the like. The data storage area may store data (for example, audio data or a phone book) created in a process of using the mobile terminal 100. In addition, the memory 120 may include a high-speed random access memory, and may further include a non-volatile memory, for example, at least one magnetic disk storage device, a flash memory device, or a universal flash storage (UFS). The processor 110 executes various function applications and data processing of the mobile terminal 100 by running instructions stored in the memory 120 and/or instructions stored in the memory disposed in the processor.

The USB interface 130 is an interface that conforms to a USB standard specification, and may be specifically a mini USB interface, a micro USB interface, a USB type-C interface, or the like. The USB interface 130 may be configured to connect to a charger to charge the mobile terminal 100, or may be configured to transmit data between the mobile terminal 100 and a peripheral device. In some examples of this disclosure, the mobile terminal 100 may establish a communication connection to the in-vehicle terminal 200 through the USB interface 130.

The power supply 140 is configured to supply power to each component of the mobile terminal 100, for example, the processor 110 and the memory 120.

The wireless communication module 150 may provide a solution, applied to the mobile terminal 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 150 may be one or more components integrating at least one communication processor module. The wireless communication module 150 receives an electromagnetic wave through an antenna, performs frequency modulation and filtering processing on the electromagnetic wave signal, and sends the processed signal to the processor 110. The wireless communication module 150 may further receive a to-be-sent signal from the processor 110, perform frequency modulation and amplification on the to-be-sent signal, and convert the signal into an electromagnetic wave through an antenna and radiate the signal.

The display 160 is configured to display an image, a video, and the like. The display 160 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile terminal 100 may include one or N displays 160, where N is a positive integer greater than 1.

For example, the in-vehicle terminal 200 mounted in a vehicle may be configured to control hardware of the vehicle, for example, play a reversing image, control an in-vehicle air conditioner, open a window, and implement entertainment functions such as music playing and radio broadcasting. In this disclosure, the in-vehicle terminal 200 may be further connected to the mobile terminal 100 to implement more extended functions, which are described in detail below.

Figure 3:
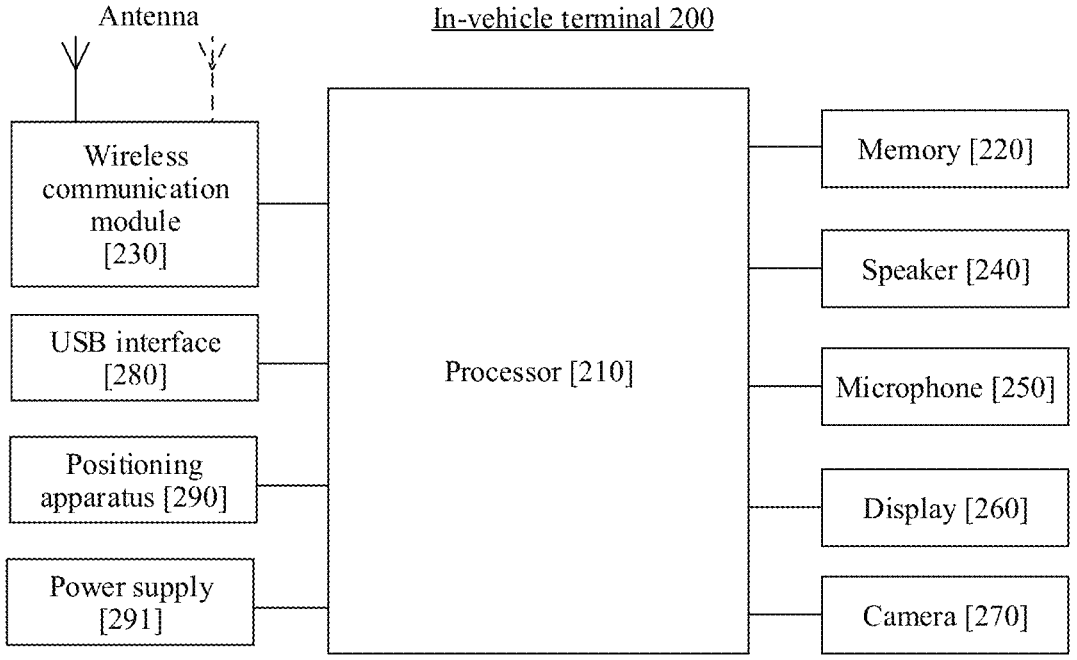
FIG. 3 is a schematic diagram of a structure of an in-vehicle terminal according to an embodiment of this disclosure.

FIG. 3 is a schematic diagram of a hardware structure of an in-vehicle terminal 200.

The in-vehicle terminal 200 may include a processor 210, a memory 220, a wireless communication module 230, a speaker 240, a microphone 250, a display 260, a camera 270, a USB interface 280, a positioning apparatus 290, a power supply 291, and the like.

The processor 210 may include one or more processing units. For example, the processor 210 is a central processing unit (CPU), or an application-specific integrated circuit (ASIC), or is configured as one or more integrated circuits for implementing embodiments of this disclosure, for example, one or more microprocessors (DSP) or one or more field programmable gate arrays (FPGA). Different processing units may be independent components, or may be integrated into one or more processors.

The memory 220 may be configured to store computer-executable program code. The executable program code includes instructions. The internal memory 220 may include a program storage area and a data storage area. The program storage area may store an operating system, an application required by at least one function (for example, a sound playing function or an image playing function), and the like. The data storage area may store data (for example, audio data or video data) created in a process of using the in-vehicle terminal 200. In addition, the memory 220 may include a high-speed random access memory, and may further include a non-volatile memory, for example, at least one magnetic disk storage device, a flash memory device, or a universal flash storage (UFS). The processor 210 executes various function applications and data processing of the in-vehicle terminal 200 by running instructions stored in the memory 220 and/or instructions stored in the memory disposed in the processor.

The wireless communication module 230 may provide a solution, applied to the in-vehicle terminal 200, to wireless communication including a WLAN, for example, a Wi-Fi network, Bluetooth, NFC, IR, and the like. The wireless communication module 230 may be one or more components integrating at least one communication processor module. In some embodiments of this disclosure, the in-vehicle terminal 200 may establish a wireless communication connection to the mobile terminal 100 through the wireless communication module 230.

The speaker 240, also referred to as a "loudspeaker", is configured to convert an audio electrical signal into a sound signal. The in-vehicle terminal 200 may be used to listen to music or answer a hands-free call through the speaker 240.

The microphone 250, also referred to as a "mike" or a "mic", is configured to convert a sound signal into an electrical signal. When a user makes a sound in a vehicle, a sound signal of the user is input into the microphone 250. At least one microphone 250 may be disposed in the in-vehicle terminal 200. In some other embodiments, two microphones 250 may be disposed in the in-vehicle terminal 200, to collect a sound signal and further implement a noise reduction function. In some other embodiments, three, four, or more microphones 250 may alternatively be disposed in the in-vehicle terminal 200, to collect a sound signal, reduce noise, further recognize a sound source, implement a directional recording function, and the like.

The display 260 is configured to display an image, a video, and the like. The display 260 includes a display panel. The display panel may be a liquid crystal display, an organic light-emitting diode, an active-matrix organic light emitting diode or an active-matrix organic light emitting diode, a flexible light-emitting diode, a mini-LED, a micro-LED, a micro-OLED, a quantum dot light-emitting diode, or the like. In some embodiments, the mobile terminal 100 may include one or N displays 260, where N is a positive integer greater than 1.

The camera 270 is configured to capture a static image or a video. An optical image of an object is generated through a lens, and is projected onto a photosensitive element. The photosensitive element may be a charge coupled device (CCD) or a complementary metal-oxide-semiconductor (CMOS) photoelectric transistor. The photosensitive element converts an optical signal into an electrical signal, then transfers the electrical signal to the processor 210 to convert the electrical signal into a digital image signal, and then converts the digital image signal into an image signal in a standard format such as RGB or YUV. In some embodiments, the in-vehicle terminal 200 may include one or N cameras 270, where N is a positive integer greater than 1. Specifically, the camera 270 may be disposed in a vehicle, and is configured to capture an image of a driver. The camera 270 may also/alternatively be disposed outside the vehicle. For example, the camera is disposed in front of the vehicle and is configured to capture an image of the front of the vehicle, or the camera may be disposed behind the vehicle and is configured to capture an image of the rear of the vehicle. The camera may alternatively be disposed on two sides of the vehicle, and is configured to capture images of the two sides of the vehicle. A disposition location of the camera is not limited in this embodiment of this disclosure.

The USB interface 280 is an interface that conforms to a USB standard specification, and may be specifically a mini USB interface, a micro USB interface, a USB type-C interface, or the like. The USB interface 280 may be configured to connect to another electronic device, for example, the mobile terminal 100. In other words, the in-vehicle terminal 200 may alternatively establish a communication connection to the mobile terminal 100 through the USB interface 280. In some other embodiments, the in-vehicle terminal 200 is alternatively connected to an external camera through the USB interface 280, to capture an image.

The positioning apparatus 290 may provide a solution of a global positioning system (GPS), a global navigation satellite system (GLONASS), a BeiDou positioning system, or the like, to implement a positioning function of the in-vehicle terminal 200.

The power supply 291 supplies power to each component of the in-vehicle terminal 200, for example, the processor 210, the memory 220, and the wireless communication module 230.

The in-vehicle terminal 200 may further include or be connected to another hardware apparatus such as an air conditioning system, a lighting system (for example, a high beam light, a low beam light, a side marker light, or an atmosphere light), a car audio, a sensor (for example, an ambient light sensor, a rainfall monitor, or an acceleration sensor), a braking system, or a throttle, and no enumeration is provided herein.

It may be understood that the structure shown in this embodiment of the present invention does not constitute a specific limitation on the in-vehicle terminal 200. In some other embodiments of this disclosure, the in-vehicle terminal 200 may include more or fewer components than those shown in the figure, or combine some components, or split some components, or have different component arrangements. The components shown in the figure may be implemented by hardware, software, or a combination of software and hardware.

Figure 4:
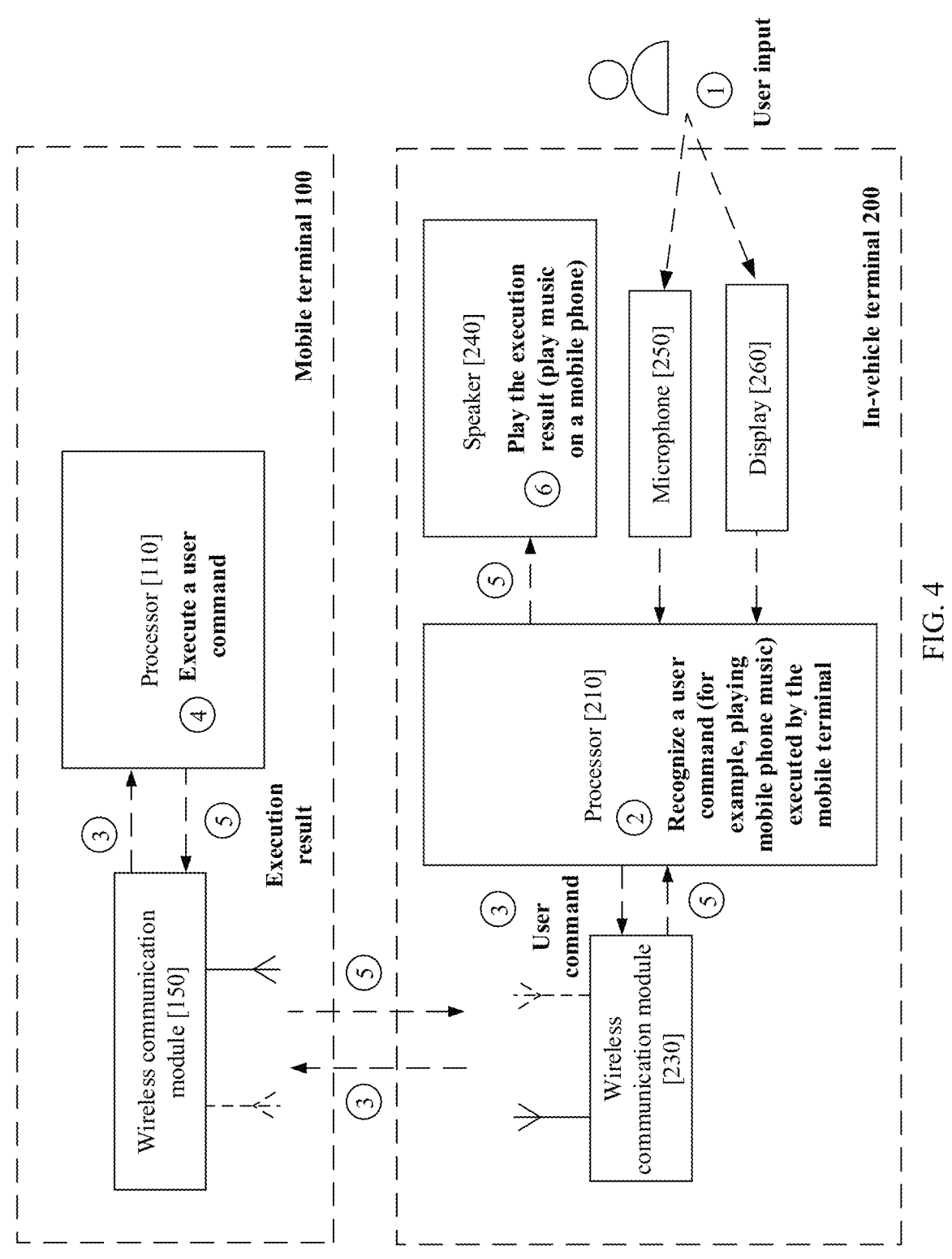
FIG. 4 is a schematic flowchart of a method for interaction between an in-vehicle terminal and a mobile terminal in a conventional technology.

In a conventional technology, after the in-vehicle terminal 200 and the mobile terminal 100 (for example, a mobile phone) establish a communication connection, the mobile terminal 100 may execute some simple user commands from the in-vehicle terminal 200. For example, FIG. 4 is a flowchart illustrating a process of interaction between the mobile terminal 100 and the in-vehicle terminal 200 in a conventional technology. Details are as follows.

Step 1: The in-vehicle terminal 200 receives a user input. For example, the microphone 250 of the in-vehicle terminal 200 collects user voice, or the display 260 of the in-vehicle terminal 200 receives a user operation. The microphone 250 or the display 260 sends the user voice or the user operation to the processor 210.

Step 2: The processor 210 of the in-vehicle terminal 200 uses the user voice or the user operation as a user command (for example, playing music on a mobile phone) that needs to be executed by the mobile terminal 100.

Step 3: The in-vehicle terminal 200 may send the user command to the mobile terminal 100 by using a wireless connection or a wired connection. For example, two devices complete transmission by using a wireless connection established by respective wireless communication modules, or two devices complete transmission by using a wired connection established by respective USB interfaces and cables. It should be noted that establishing a wireless connection is used as an example for description in FIG. 4.

Step 4: After receiving the user command, the processor 110 of the mobile terminal 100 executes the user command, for example, running a music application.

Step 5: The processor 110 of the mobile terminal 100 sends an execution result (for example, audio data corresponding to music to be played) to the in-vehicle terminal 200 by using a wireless connection or a wired connection.

Step 6: After receiving the execution result of the mobile terminal, the in-vehicle terminal 200 invokes the speaker 240 to broadcast the execution result, or invokes the display 260 to display the execution result. For example, the audio data corresponding to the music to be played is transmitted to the speaker 240, and played by the speaker 240.

In conclusion, the mobile terminal 100 may directly execute a simple user command from the in-vehicle terminal 200. However, in a driving process, the user usually expects to execute more complex user commands. This meets diversified function requirements of the user, and also avoids distraction of the user during driving as much as possible. This ensures driving safety. For example, when the mobile terminal 100 executes a complex user command, a hardware apparatus or a software apparatus on the in-vehicle terminal 200 needs to be first invoked to obtain some information, and then a task corresponding to the user command can be completed based on the information. No corresponding solution is provided in a conventional technology.

Therefore, this disclosure provides an interaction method. After receiving the user command of the in-vehicle terminal 200, the mobile terminal 100 may automatically analyze the user command. When it is determined that the software apparatus or the hardware apparatus of the in-vehicle terminal 200 needs to be invoked to collect information, the mobile terminal 100 may automatically send a collection indication to the in-vehicle terminal 200, and complete execution of the user command after obtaining corresponding information. For example, FIG. is a schematic flowchart of an interaction method according to this disclosure.

Specifically, for step 1 to step 3, refer to step 1 to step 3 in FIG. 4.

Step 4: After receiving the user command, the processor 110 of the mobile terminal 100 analyzes the user command. When it is determined that the in-vehicle terminal 200 needs to collect information, a collection indication is automatically generated. For example, an external camera of the in-vehicle terminal needs to be invoked to take a photo of the outside of a vehicle.

Step 5: The processor 110 of the mobile terminal 100 sends the collection indication to the in-vehicle terminal 200 by using a wireless connection or a wired connection.

Step 6: After receiving the collection indication, the processor 210 of the in-vehicle terminal 200 invokes the hardware apparatus or the software apparatus of the in-vehicle terminal 200 to collect corresponding information. For example, the external camera of the in-vehicle terminal is invoked to take the photo of the outside of the vehicle, or a positioning apparatus is invoked to obtain a current location of the vehicle, or a temperature sensor is invoked to obtain a current temperature inside the vehicle.

Step 7: After obtaining the collected information, the processor 210 of the in-vehicle terminal 200 sends the collected information to the mobile terminal 100.

Step 8: After receiving the collected information, the processor 110 of the mobile terminal 100 completes execution of the user command.

Step 9: The processor 110 of the mobile terminal 100 sends an execution result (for example, audio data corresponding to music to be played) to the in-vehicle terminal 200 by using a wireless connection or a wired connection.

Step 10: After receiving the execution result of the mobile terminal, the in-vehicle terminal 200 invokes the speaker 240 to broadcast the execution result, or invokes the display 260 to display the execution result.

Figure 5:
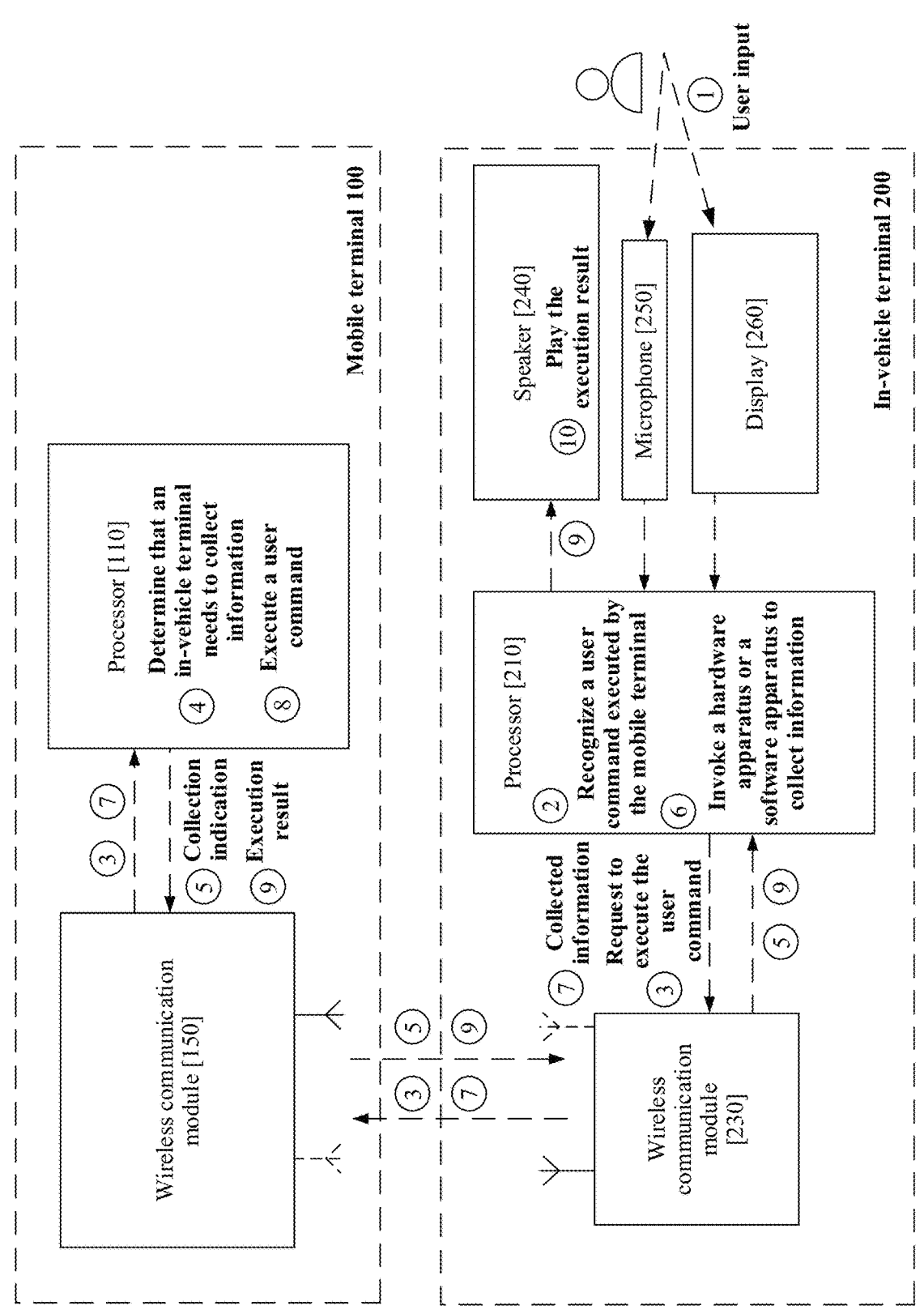
FIG. 5 is a schematic flowchart of a method for interaction between an in-vehicle terminal and a mobile terminal according to an embodiment of this disclosure.

It can be learned from comparison between FIG. 4 and FIG. 5 that, in the technical solution provided in this disclosure, after receiving the user command of the in-vehicle terminal 200, the mobile terminal 100 may analyze the user command. When it is determined that software and hardware of the in-vehicle terminal 200 need to be invoked to further collect information, the mobile terminal 100 automatically sends the collection indication to the in-vehicle terminal 200. It can be learned that, according to the interaction method provided in this embodiment of this disclosure, intelligent interaction between the mobile terminal 100 and the in-vehicle terminal 200 can be implemented, so that the mobile terminal 100 can execute a more complex user command. This meets diversified requirements of the user. In addition, because the interaction method does not additionally increase a quantity of times of interaction between the in-vehicle terminal 200 and the user, distraction of the user is avoided. This ensures driving safety.

Figure 6:
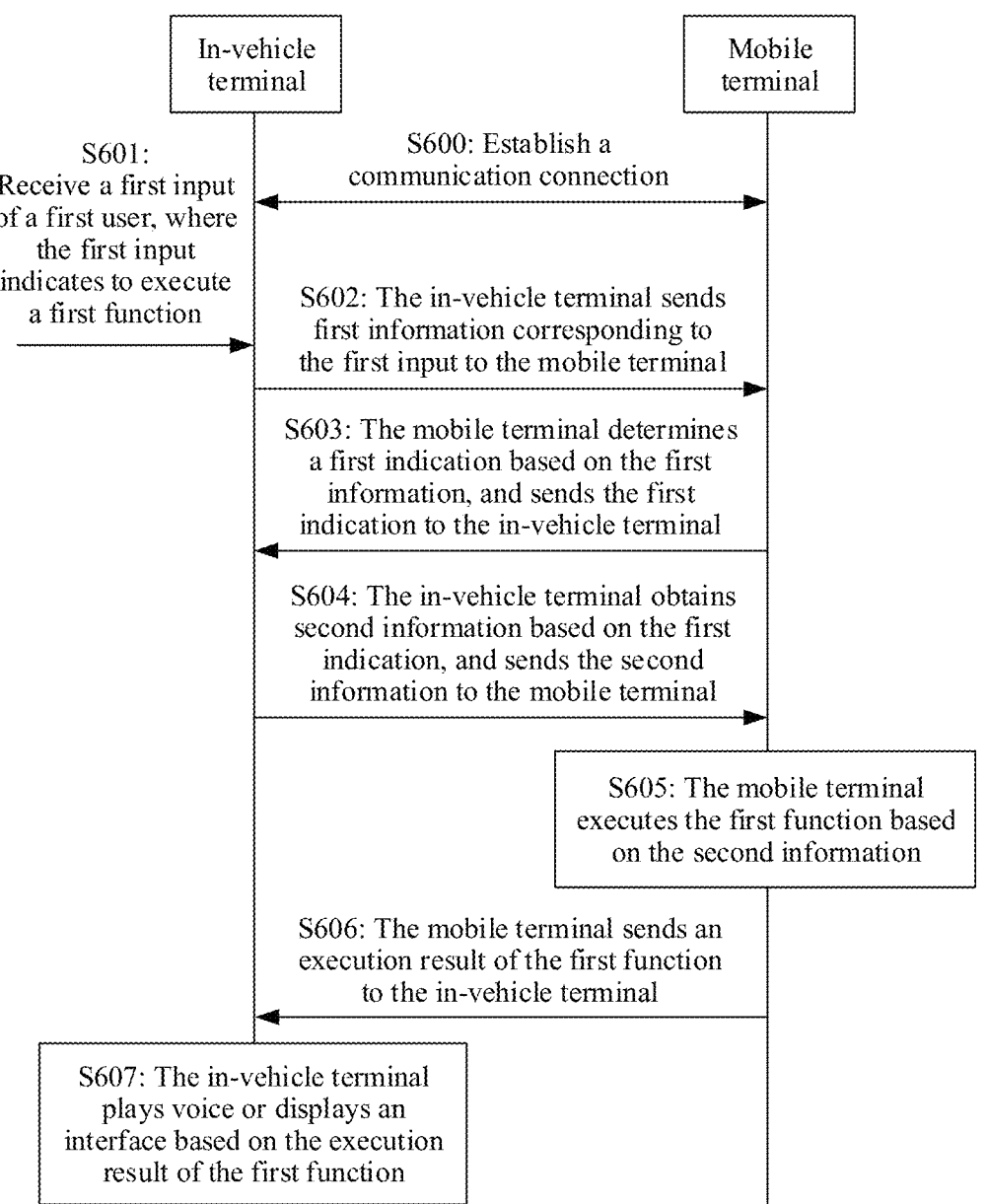
FIG. 6 is a schematic flowchart of a method for interaction between an in-vehicle terminal and a mobile terminal according to an embodiment of this disclosure.

FIG. 6 is a schematic flowchart of still another method for interaction between a mobile terminal and an in-vehicle terminal according to an embodiment of this disclosure. Details are as follows.

S600: An in-vehicle terminal establishes a communication connection to a mobile terminal.

Specifically, the in-vehicle terminal may establish a wired connection to the mobile terminal through a USB interface. Alternatively, the in-vehicle terminal establishes a wireless connection to the mobile terminal through a wireless communication module. A wireless connection manner may be, for example, Bluetooth (including Bluetooth Low Energy, Bluetooth Classic, and the like), a WLAN, NFC, or IR. The wireless connection manner is not limited in this embodiment of this disclosure.

In a specific embodiment of this disclosure, the in-vehicle terminal and the mobile terminal may establish a communication connection by using a first application (for example, a HiCar application, application software for connecting the in-vehicle terminal to the mobile terminal).

In some examples, the in-vehicle terminal and the mobile terminal establish a communication connection for the first time.

Figure 7:
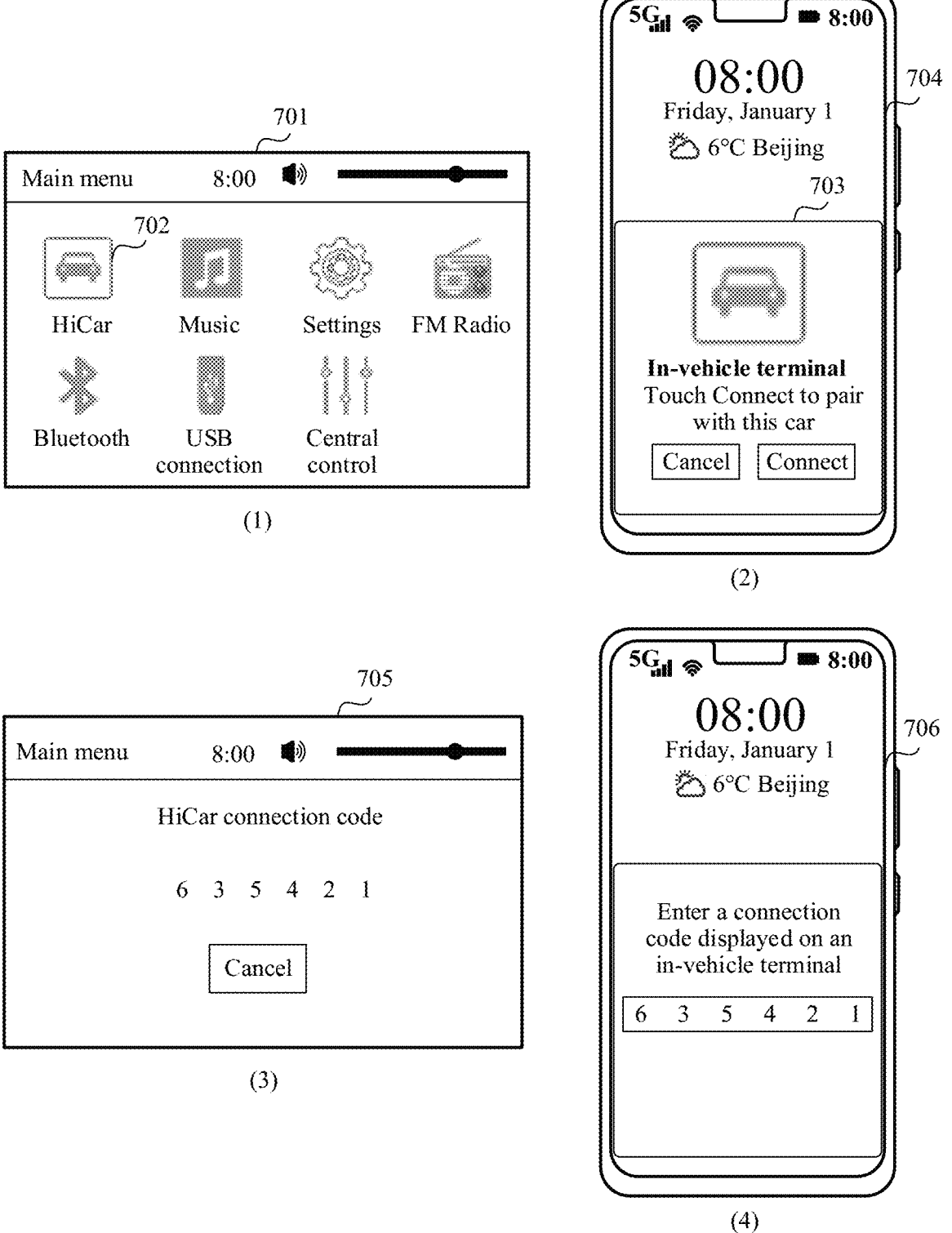
FIG. 7 is a schematic diagram of some interfaces of an in-vehicle terminal and a mobile terminal according to an embodiment of this disclosure.
Figure 8:
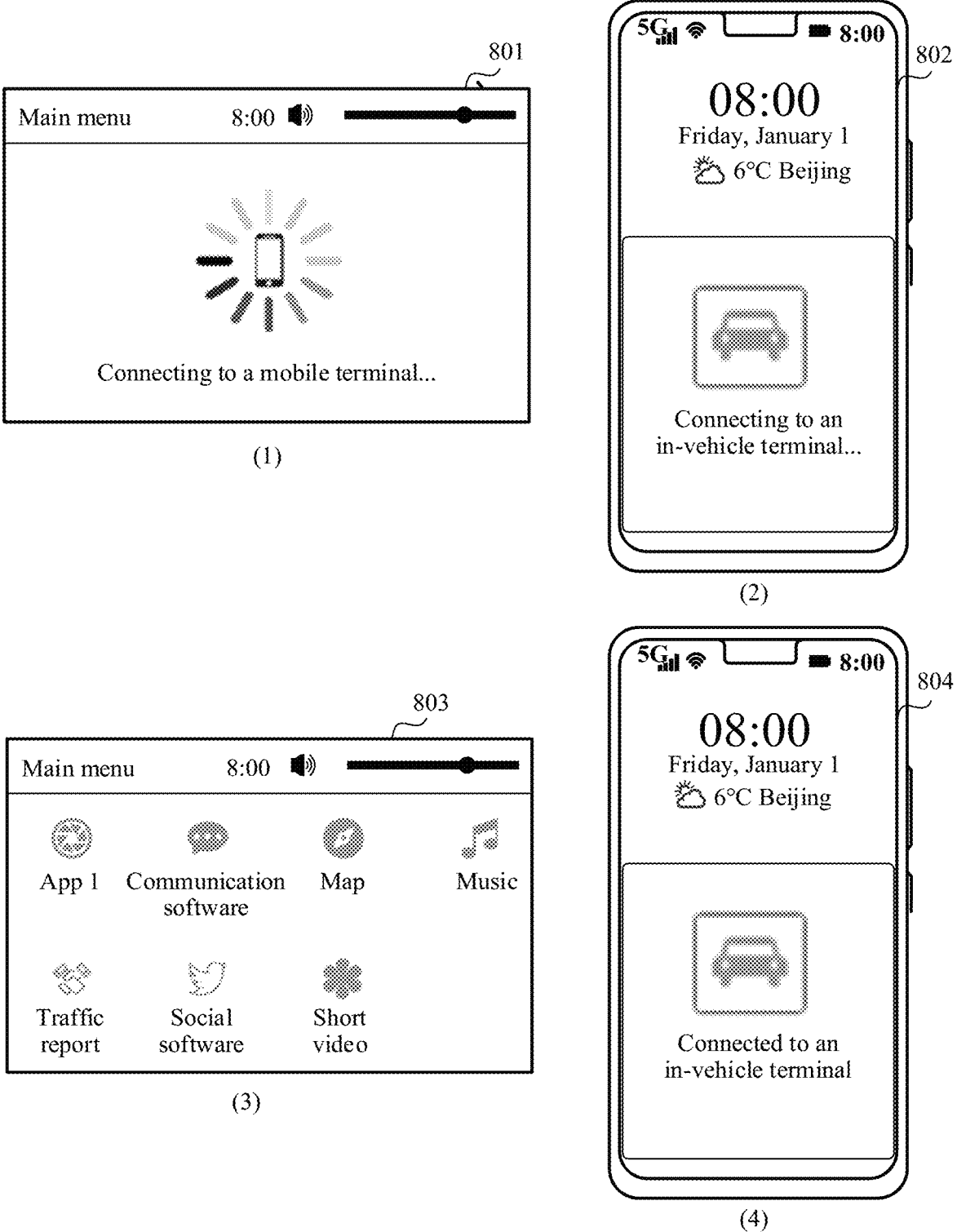
FIG. 8 is a schematic diagram of some interfaces of an in-vehicle terminal and a mobile terminal according to an embodiment of this disclosure.

A main menu 701 displayed by the in-vehicle terminal is shown in (1) in FIG. 7. A HiCar application icon 702 and other application icons are displayed in the main menu. The in-vehicle terminal may send a connection request in response to a user operation on the icon 702. For example, if the in-vehicle terminal and the mobile terminal establish a wired link through a USB interface, the in-vehicle terminal sends the connection request to the mobile terminal through the wired link. For another example, the in-vehicle terminal may alternatively send a Bluetooth request in a broadcast manner through a wireless link. Optionally, before sending the Bluetooth request in a broadcast manner, the in-vehicle terminal may prompt a user to enable Bluetooth of the mobile terminal and move the mobile terminal closer to the in-vehicle terminal. After receiving the connection request sent by the in-vehicle terminal, the mobile terminal may display an interface 704 shown in (2) in FIG. 7. A prompt box 703 is displayed in the interface 704, to prompt the user whether to choose to connect to the in-vehicle terminal. In response to that the user selects the "connect" control in the prompt box 703, the mobile terminal returns, to the in-vehicle terminal, a response indicating agreeing to the connection. After receiving the response that is sent during movement and that indicates agreeing to the connection, the in-vehicle terminal displays a connection code shown in (3) in FIG. 7. Similarly, the mobile terminal displays an interface 706 shown in (4) in FIG. 7, to prompt the user to enter the connection code displayed by the in-vehicle terminal. After the user enters the connection code, the mobile terminal sends the connection code entered by the user to the in-vehicle terminal, and the in-vehicle terminal performs verification, and establishes the communication connection after the verification succeeds. Optionally, in a process of establishing the communication connection, the in-vehicle terminal may display an interface 801 shown in (1) in FIG. 8, and the mobile terminal may display an interface 802 shown in (2) in FIG. 8, to separately prompt the user that a connection is being established. After the in-vehicle terminal establishes the communication connection to the mobile terminal, the mobile terminal synchronizes some application software to the in-vehicle terminal. The in-vehicle terminal may display an interface 803 shown in (3) in FIG. 8, where the interface 803 displays the application software synchronized by the mobile terminal. In other words, the user may operate the synchronized application software on the in-vehicle terminal, the in-vehicle terminal sends an operation of the user to the mobile terminal, and the mobile terminal runs corresponding application software to execute a corresponding operation, and then feeds back an execution result to the in-vehicle terminal. Optionally, after the in-vehicle terminal establishes the communication connection to the mobile terminal, the mobile terminal may display a prompt interface 804 shown in (4) in FIG. 8, to prompt that the mobile terminal has already been connected to the in-vehicle terminal, and then the user may manually close the prompt interface 804, or the mobile terminal may automatically close the prompt interface 804 after a preset time period.

In some other examples, if the in-vehicle terminal has previously established a communication connection to the mobile terminal, the in-vehicle terminal may alternatively directly perform Bluetooth pairing with the mobile terminal, and the user does not need to enter the connection code. For example, the user may enable the HiCar application on the mobile terminal, and choose to connect to the in-vehicle terminal to which the mobile terminal has been connected. In this case, the mobile terminal directly establishes the communication connection to the in-vehicle terminal.

In some other examples, if the in-vehicle terminal has previously established a communication connection to the mobile terminal, when Bluetooth is enabled on both the mobile terminal and the in-vehicle terminal, and a distance between the mobile terminal and the in-vehicle terminal falls within a preset range, the mobile terminal and the in-vehicle terminal may also automatically establish the communication connection without a user operation.

S601: The in-vehicle terminal receives a first input of a first user, where the first input indicates to execute a first function.

The first input may be voice input by the first user, or may be an operation of the first user on a corresponding control on a display (usually a touchscreen) of the in-vehicle terminal, or may be an operation on a corresponding physical button (for example, a button on a steering wheel), or may be an air gesture operation of the first user, or the like. The first function may be, for example, sending information (for example, sending a location, a photo, or a video), reporting traffic, recording a short video, or sending a hardware parameter of the in-vehicle terminal.

In other words, a microphone of the in-vehicle terminal collects the voice input by the first user, or a display (usually a touchscreen) of the in-vehicle terminal receives an operation performed by the first user on the touchscreen, or the like.

S602: The in-vehicle terminal sends first information corresponding to the first input to the mobile terminal.

Correspondingly, the mobile terminal receives the first information sent by the in-vehicle terminal.

In other words, the in-vehicle terminal sends the collected first information corresponding to the first input to the mobile terminal by using the communication connection established in step S600.

For example, when the first input is voice input by the user, the first information may be the voice input by the user, or the first information is text information that is corresponding to the voice and that is recognized by the in-vehicle terminal based on the voice input by the user. Alternatively, the first information is information that is about the first function executed by the user and that is determined by the in-vehicle terminal based on the voice input by the user.

For another example, when the first input is an operation performed by the user on the display, the first information may be a location at which a finger of the user touches the display, so that the mobile terminal can determine, based on the location, the first function executed by the user. Alternatively, the first information may be information that is about the first function executed by the user and that is determined by the in-vehicle terminal. For example, the in-vehicle terminal determines, based on the location at which the finger of the user touches the display and an interface displayed by the in-vehicle terminal, the first function executed by the user. Then, the in-vehicle terminal may send the information about the first function to the mobile terminal, so that the mobile terminal executes the first function.

S603: The mobile terminal determines a first indication based on the first information, and sends the first indication to the in-vehicle terminal.

Correspondingly, the in-vehicle terminal receives the first indication sent by the mobile terminal.

For example, the mobile terminal performs intention recognition on the first information, to recognize an intention corresponding to the first information. Then, the intention is analyzed, and whether the in-vehicle terminal needs to be invoked to collect information is determined. If it is determined that the in-vehicle terminal needs to be invoked to collect the information, the corresponding first indication is generated. The first indication indicates software and hardware apparatuses (namely, the software apparatus and/or the hardware apparatus) of the in-vehicle terminal to collect corresponding information (namely, second information). The software and hardware apparatuses of the in-vehicle terminal include, for example, a camera, a positioning apparatus, an air conditioning system, a lighting system, a sensor (for example, an acceleration sensor, an ambient light sensor, or a rainfall sensor), a car audio, and software (for example, a map or a player) that has been installed on the in-vehicle terminal.

In some examples, the first indication may be a task for indicating the in-vehicle terminal to collect the second information. In this way, after receiving the first indication, the in-vehicle terminal determines which software and hardware apparatuses are to be invoked to collect the second information, and invokes the determined software and hardware apparatuses to collect the second information. In some other examples, the first indication may alternatively indicate which software and hardware apparatuses of the in-vehicle terminal are to be invoked to collect the second information. In this case, after receiving the first indication, the in-vehicle terminal directly executes a corresponding command. Content and a format of the first indication are not limited in this embodiment of this disclosure.

An example in which the first information is user voice is used for description. The mobile terminal performs voice recognition, semantic analysis (for example, by using a natural language understanding (NLU) technology), and the like on the user voice, to obtain an intention corresponding to the user voice. Then, one or more pieces of software are determined from software of the mobile terminal based on the intention of the user, to implement the intention of the user. In addition, the first information is converted into several control commands, and the several control commands are sent to the one or more pieces of software.

In an optional implementation, after receiving the first information, the mobile terminal may send, to the corresponding software, the control commands converted from the first information, and the software performs corresponding actions immediately after receiving the control commands. When the software executes the control commands, if it is determined that information required by one or more control commands is missing, for example, the second information that needs to be collected by the in-vehicle terminal, the mobile terminal generates the first indication. After receiving the second information, the mobile terminal forwards the second information to the software, and the software continues to execute the suspended control commands.

In another optional implementation, after converting the first information into the control commands, the mobile terminal may alternatively analyze the control commands to determine whether the control commands can be completely executed. The missing information may be determined based on an analysis result, and then the first indication is sent to the in-vehicle terminal to collect the missing information (namely, the second information). After the missing information is received, both the control commands and the second information are sent to the software, and then the software completely executes the control commands.

For example, if it is determined that the intention of the user is "sharing a location with a friend A", a series of control commands generated by the mobile terminal include: opening a friend list, finding the friend A, opening a chat window of the friend A, entering information (location information) to be sent, determining to send, and the like. When the control command "entering information (location information) to be sent" is executed, the location information is missing, and the mobile terminal determines that the location information needs to be collected. In this case, the mobile terminal generates the first indication, and sends the first indication to the in-vehicle terminal, to indicate the in-vehicle terminal to invoke a positioning apparatus to collect the location information, and return the collected location information to the mobile terminal, so that the mobile terminal continues to execute the related control commands.

For another example, if it is determined that the intention of the user is "sharing a video (or a photo) of the front of a vehicle", because the video (or the photo) of the front of the vehicle needs to be captured by a camera outside the vehicle, it is determined that the intention needs to invoke a camera of the in-vehicle terminal to capture an image. In this case, the first indication may indicate the in-vehicle terminal to invoke the camera to capture the image, and return the captured image to the mobile terminal. Further, the first indication specifically indicates the in-vehicle terminal to invoke the camera outside the vehicle to capture the image, and return the image to the mobile terminal.

For another example, if it is determined that the intention of the user is "reporting a violation", because the user usually observes a violation event and indicates to report a violation when driving a vehicle, it is determined that the intention also needs to invoke the camera of the in-vehicle terminal to capture an image. In this case, the first indication may indicate the in-vehicle terminal to invoke the camera to capture the image, and return the captured image to the mobile terminal.

S604: The in-vehicle terminal obtains the second information based on the first indication, and sends the second information to the mobile terminal.

Correspondingly, the mobile terminal receives the second information sent by the in-vehicle terminal.

For example, with reference to the foregoing description, it can be learned that the second information may be information collected by the software and hardware apparatuses of the in-vehicle terminal, for example, the image captured by the camera of the in-vehicle terminal, the location information obtained by the positioning apparatus of the in-vehicle terminal, data processed by the software of the in-vehicle terminal, a parameter of an air conditioner of the in-vehicle terminal, or data collected by a sensor of the in-vehicle terminal.

Specifically, the in-vehicle terminal invokes the corresponding software apparatus or hardware apparatus based on the first indication to obtain the second information. Then, the in-vehicle terminal returns the collected second information to the mobile terminal.

It should be noted that the mobile terminal may indicate the in-vehicle terminal to invoke one or more software and hardware apparatuses to collect information, or indicate the in-vehicle terminal to invoke one or more hardware apparatuses to collect information for one or more times. This is not limited in this embodiment of this disclosure.

For example, if the first indication indicates to collect the location information of the in-vehicle terminal, the in-vehicle terminal may invoke the positioning apparatus of the in-vehicle terminal to obtain a geographical location (for example, latitude and longitude data or GPS data) of the in-vehicle terminal.

For another example, if the first indication indicates a video captured by the camera of the in-vehicle terminal, the in-vehicle terminal may invoke the camera of the in-vehicle terminal to capture an image in real time, and return the image to the mobile terminal in real time. Alternatively, the camera of the in-vehicle terminal may be invoked to capture a video of a period of time, and then the video is returned to the mobile terminal at a time.

S605: The mobile terminal executes the first function based on the second information.

After obtaining the second information, the mobile terminal may invoke software (for example, communication software, short video software, or reporting software) of the mobile terminal based on the obtained second information, to execute the first function based on the intention of the user. It should be noted that, in this case, the software of the mobile terminal invoked by the mobile terminal is generally application software synchronized to the in-vehicle terminal.

In some examples, the second information is information directly required by the software. In this case, after receiving the second information, the mobile terminal may directly send the second information to the software, and does not need to perform secondary processing on the second information.

For example, if the intention of the user is "sharing a location with a friend", after obtaining the location information (namely, the second information) of the vehicle, the mobile terminal may directly invoke the communication software (such as an SMS message, WeChat®, or QQ®) of the mobile terminal to send the location information of the vehicle to the friend. For another example, if the intention of the user is "sharing a video of the front of a vehicle", after obtaining the video taken by the in-vehicle terminal, the mobile terminal invokes the short video software of the mobile terminal to post the video taken by the in-vehicle terminal.

In some other examples, if the second information is not information directly required by the software, the mobile terminal needs to perform secondary processing on the second information, and send a result obtained through the secondary processing to the software.

For example, if the intention of the user is "shooting a short video", after obtaining a photo/video (namely, the second information) taken by the in-vehicle terminal, the mobile terminal may clip the video (or the photo), and post a clipped video on the Internet by using the short video software. For another example, if the intention of the user is "reporting a violation", after obtaining a photo/video (namely, the second information) taken by the in-vehicle terminal, the mobile terminal may perform processing such as image recognition on the video (or the photo), to determine whether a violation event exists. If it is determined that the violation event exists, reporting may be performed by using the reporting software of the mobile terminal. If it is determined that no violation event exists, the reporting software does not need to be invoked.

In some scenarios, after the mobile terminal obtains the second information and processes the second information, when it is determined that the software and hardware apparatuses of the in-vehicle terminal further need to be invoked to obtain other information again to execute the first function, the mobile terminal may still send a collection indication to the in-vehicle terminal again. In other words, a quantity of times that the mobile terminal automatically sends the collection indication to the in-vehicle terminal when executing the first function, and a quantity of pieces of software and hardware of the in-vehicle terminal that are invoked for each collection indication are not limited in this embodiment of this disclosure.

It should be noted that this step means that after obtaining the second information, the mobile terminal performs data processing, related to the second information, in the first function. Before or after sending the first indication to the in-vehicle terminal, the mobile terminal may start to invoke the synchronized application software to perform other data processing, unrelated to the second information, in the first function, for example, execute another control command unrelated to the second information. In some other examples, after receiving the second information, the mobile terminal may alternatively start to invoke the synchronized application software to execute the first function (including executing a control command related to the second information and executing a control command unrelated to the second information). That is, an occasion for the mobile terminal to perform other data processing, unrelated to the second information, in the first function is not limited in this embodiment of this disclosure. However, it should be noted that the mobile terminal can complete the execution of the first function and obtain the execution result only after obtaining the second information.

It should be further noted that, when executing the first function, the mobile terminal may further interact with a server through a wireless network or a mobile communication network, to obtain information from the server, or the server performs partial processing. This is not limited in this embodiment of this disclosure.

S606: The mobile terminal sends the execution result of the first function to the in-vehicle terminal.

Correspondingly, the in-vehicle terminal receives the execution result of the first function sent by the mobile terminal.

After invoking the synchronized application software to execute the first function, the mobile terminal may send the execution result to the in-vehicle terminal by using the HiCar application. For example, the mobile terminal draws a corresponding interface, and sends interface data (namely, the execution result) to the in-vehicle terminal, so that the mobile terminal displays the interface data. Alternatively, the mobile terminal generates corresponding voice, and sends voice data (namely, the execution result) to the in-vehicle terminal.

S607: The in-vehicle terminal plays voice or displays an interface based on the execution result of the first function.

For example, the in-vehicle terminal invokes a speaker or a car audio to broadcast the execution result of the first function by voice, and/or invokes a display to display the interface corresponding to the execution result of the first function.

Figure 9:
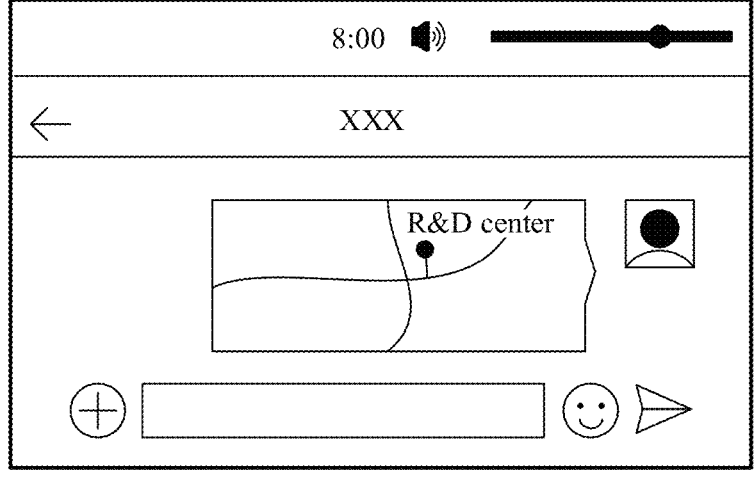
FIG. 9 is a schematic diagram of an interface on which an in-vehicle terminal displays prompt information according to an embodiment of this disclosure.

For example, if the intention of the user is "sharing a location with a friend in real time" after "sharing a location with a friend", after the foregoing steps are performed, the mobile terminal sends interface data to the in-vehicle terminal, and the in-vehicle terminal may, for example, draw the interface shown in (1) or (2) in FIG. 9 based on the interface data. Certainly, the in-vehicle terminal may alternatively prompt the first user in a voice playing manner. The prompt manner is not limited in this embodiment of this disclosure.

In conclusion, in the interaction method provided in this embodiment of this disclosure, after the user sends a complex command on the in-vehicle terminal, the in-vehicle terminal sends the command to the mobile terminal, and the mobile terminal analyzes the complex command, intelligently interacts with the in-vehicle terminal, and invokes the software and hardware apparatuses of the in-vehicle terminal to collect information, to satisfy a deep intention of the user. In addition, because the interaction method does not additionally increase a quantity of times of interaction between the in-vehicle terminal and the user, distraction of the user is avoided. This ensures driving safety.

In addition, in this disclosure, because the mobile terminal analyzes a complex user command and performs intelligent interaction with the in-vehicle terminal, there is no rigid requirement on a processor of the in-vehicle terminal. Therefore, this disclosure may be applied to interaction between most in-vehicle terminals and mobile terminals, and has a wide application scope. In addition, generally, an update cycle of an in-vehicle terminal is longer (an update cycle of an automobile is long), an update cycle of a mobile terminal is shorter, and a processing capability of the mobile terminal is stronger. Therefore, the mobile terminal analyzes a complex user command, to help a vehicle that is not intelligent enough to be intelligent.

The following describes, by using examples, several application scenarios in which the technical solutions of this disclosure are used.

Application scenario 1: Location information is sent to or a location is shared with a friend (namely, a second user).

The mobile terminal may establish a communication connection to the in-vehicle terminal manually by a user, or the mobile terminal is automatically connected to the in-vehicle terminal.

When the first user says "sending a current location to Jack", after collecting voice of the first user, the microphone of the in-vehicle terminal sends the voice of the first user to the mobile terminal. The mobile terminal performs voice recognition on the voice of the first user, and recognizes a corresponding text. In some examples, when voice recognition software is configured on the in-vehicle terminal, the in-vehicle terminal may alternatively recognize the text from the voice of the first user, and then send the recognized text to the mobile terminal.

The mobile terminal performs intention recognition on the recognized text, and recognizes that the first user wants to send the location to the friend. In some embodiments, if the mobile terminal detects that the mobile terminal is connected to the in-vehicle terminal and the HiCar application is enabled, the mobile terminal preferentially obtains a location of a vehicle from the in-vehicle terminal by default. Alternatively, if the user command that the mobile terminal needs to collect the location information is sent by the in-vehicle terminal, the location of the vehicle is also obtained from the in-vehicle terminal by default.

When determining that the positioning apparatus of the in-vehicle terminal needs to be invoked to collect the location of the vehicle, the mobile terminal may automatically send a location collection command to the in-vehicle terminal. After receiving the location collection command, the in-vehicle terminal invokes the positioning apparatus to collect the current location (for example, longitude and latitude data or GPS data) of the vehicle, and returns the current location to the mobile terminal. After receiving the current location of the vehicle returned by the in-vehicle terminal, the mobile terminal may invoke map software of the mobile terminal to display the current location of the vehicle on a map.

After obtaining the location of the in-vehicle terminal, the mobile terminal invokes the communication software (such as an SMS message, WeChat®, and QQ®) of the mobile terminal to send, to Jack, the map that displays the current location of the vehicle. In some other examples, when a plurality of pieces of communication software are installed on the mobile terminal, the mobile terminal may select, by default, the software frequently used by the first user, to send the location of the in-vehicle terminal. Alternatively, the mobile terminal may select to traverse information about contacts in each piece of communication software, and select the communication software whose contacts include the friend in a voice command for sending. Selection of the communication software is not limited in this disclosure.

In the foregoing embodiment, the mobile terminal sends the current location to the friend Jack once. If the first user needs to share a real-time location with Jack, for example, the first user says "sharing the real-time location with Jack", the in-vehicle terminal invokes the positioning apparatus to obtain the real-time location of the vehicle (or a location at a fixed time interval), and returns the real-time location to the mobile terminal. The mobile terminal shares the location with the friend in real time.

In some other embodiments, when the in-vehicle terminal stores some specific location information, for example, the map software of the in-vehicle terminal stores fixed location information, for example, a location of a home, a location of a company, a location of a school, or location information of an airport or a station collected by the first user, the specific location information can also be quickly shared with a friend according to the method provided in this embodiment of this disclosure.

For example, if the first user says "sending the location of the home to Jack", after receiving a first user command from the in-vehicle terminal, the mobile terminal may send a collection indication to the in-vehicle terminal, and the in-vehicle terminal may invoke location information of the home in the map software of the in-vehicle terminal, and return the location information to the mobile terminal. Then, the mobile terminal sends the location information to the friend Jack by using the communication software of the mobile terminal.

After sending the location to the friend, the mobile terminal may notify the in-vehicle terminal, and the in-vehicle terminal displays a prompt or plays voice to notify the first user.

Application scenario 2: A photo/video is shared with the friend (the second user).

The mobile terminal establishes a communication connection to the in-vehicle terminal.

When the first user wants to share a scenery or a thing (for example, a beautiful natural scenery or an interesting thing) in front of the vehicle with the friend, or notify the friend of a traffic anomaly (an accident, a traffic jam, surface gathered water, a collapse, or the like) by using the photo or the video, the first user may say "sending the photo/video of the front of the vehicle to Jack". After collecting voice of the first user, the microphone of the in-vehicle terminal sends the voice of the first user to the mobile terminal. The mobile terminal performs voice recognition on the voice of the first user, and recognizes a corresponding text. Alternatively, when the voice recognition software is configured on the in-vehicle terminal, the in-vehicle terminal may recognize the text from the voice of the first user, and then send the recognized text to the mobile terminal.

The mobile terminal performs intention recognition on the recognized text, and recognizes that the first user wants to send the photo/video of the front of the vehicle to the friend. Further, when determining that the camera of the in-vehicle terminal (or a camera externally connected to the in-vehicle terminal) needs to be invoked to take the photo/video, the mobile terminal may automatically send an image capture command (which may be specifically a command for capturing an image of the front of the vehicle) to the in-vehicle terminal. In an example, after receiving the image capture command, the in-vehicle terminal determines to invoke a specific camera (a camera for shooting the front of the vehicle) of the in-vehicle terminal to capture an image, to obtain the photo/video, and returns the photo/video to the mobile terminal. In some other examples, after receiving the image capture command, the in-vehicle terminal may alternatively invoke a plurality of cameras of the in-vehicle terminal to capture images, to obtain a plurality of photos/videos, and return the plurality of photos/videos to the mobile terminal. Then, the mobile terminal selects a specific photo/video from the plurality of photos/videos based on the intention of the first user.

In other words, when the voice of the first user includes orientation information, the mobile terminal may further determine to invoke a camera of the in-vehicle terminal corresponding to the orientation information to capture an image, or select an image corresponding to the orientation information from a plurality of images captured by the plurality of cameras of the in-vehicle terminal, to obtain the specific photo/video.

After obtaining the specific photo/video, the mobile terminal invokes the communication software (such as SMS message, WeChat®, or QQ®) of the mobile terminal to send the specific photo/video to Jack.

Optionally, the mobile terminal may further perform other processing on the photo/video captured by the in-vehicle terminal, for example, adding a watermark such as a shooting date and time, a shooting location, and a vehicle model. This is not limited in this embodiment of this disclosure.

After sending the photo/video, the mobile terminal may notify the in-vehicle terminal, and the in-vehicle terminal displays a prompt or plays voice to notify the first user.

For example, when observing a traffic anomaly (an accident, a traffic jam, surface gathered water, a collapse, or the like), the first user may notify the friend by using the photo or the video. In this case, the mobile terminal may indicate the in-vehicle terminal to take the photo or the video, and indicates the in-vehicle terminal to collect the location of the vehicle. Then, the mobile terminal may send both the photo or the video captured by the in-vehicle terminal and the location of the vehicle to the friend, to notify the friend of the traffic anomaly herein.

Application scenario 3: A short video is posted.

The mobile terminal establishes a communication connection to the in-vehicle terminal.

The first user may say "post a short video". After collecting voice of the first user, the microphone of the in-vehicle terminal sends the voice of the first user to the mobile terminal. The mobile terminal performs voice recognition on the voice of the first user, and recognizes a corresponding text. Alternatively, when the voice recognition software is configured on the in-vehicle terminal, the in-vehicle terminal may recognize the text from the voice of the first user, and then send the recognized text to the mobile terminal.

The mobile terminal performs intention recognition on the recognized text, and recognizes that the first user wants to post the short video. Further, when determining that the camera of the in-vehicle terminal (or the camera externally connected to the in-vehicle terminal) needs to be invoked to take the short video, the mobile terminal may automatically send an image capture command to the in-vehicle terminal.

In an example, after receiving the image capture command, the in-vehicle terminal determines to invoke a specific camera (a camera for shooting the front of the vehicle) of the in-vehicle terminal to capture an image, to obtain the video, and returns the video to the mobile terminal. In some other examples, after receiving the image capture command, the in-vehicle terminal may alternatively invoke a plurality of cameras of the in-vehicle terminal to capture images, to obtain a plurality of videos, and return the plurality of videos to the mobile terminal. Then, the mobile terminal selects a specific video from the plurality of videos based on the intention of the first user for posting. Alternatively, the mobile terminal merges the images captured by the plurality of cameras, and a merged video is posted.

The images captured by the plurality of cameras may be merged in a shooting time sequence, and the images captured by all the camera at a same moment are merged into one image (namely, one frame of image in the video). In other words, each frame of image in the merged video includes the images captured by the plurality of cameras. Merging the images captured by the plurality of cameras may alternatively be clipping together the photos/videos captured by all the cameras. In other words, total duration of a merged video is equal to (or approximately equal to) a sum of duration of the videos captured by all the cameras. It should be noted that the merging herein may be clipping together the complete videos (or all the photos) captured by all the cameras, or may be selecting, by using an AI technology or the like, some video frames (or photos) from the videos (or all the photos) captured by all the cameras and clipping the video frames (or photos) together. The merging manner is not limited in this embodiment of this disclosure.

Optionally, the mobile terminal may further perform other processing on the video captured by the in-vehicle terminal, for example, adding a watermark such as a shooting date and time, a shooting location, and a vehicle model, and adding a background music. This is not limited in this embodiment of this disclosure. It should be noted that the image processing work may be performed by the short video software of the mobile terminal, or may be performed by another processing module (other than the short video software) of the mobile terminal.

Then, the mobile terminal invokes the short video software (such as TikTok®) or social software (such as Weibo®) of the mobile terminal to post the video.

Similarly, after posting the video, the mobile terminal may notify the in-vehicle terminal, and the in-vehicle terminal displays a prompt or plays voice to notify the first user.

Application scenario 4: A violation is reported.

The mobile terminal establishes a communication connection to the in-vehicle terminal.

When the first user finds a violation phenomenon in a driving process, the first user may say "reporting a violation of a vehicle in front/on the right/on the left". After collecting voice of the first user, the microphone of the in-vehicle terminal sends the voice of the first user to the mobile terminal. The mobile terminal performs voice recognition on the voice of the first user, and recognizes a corresponding text. In some examples, when voice recognition software is configured on the in-vehicle terminal, the in-vehicle terminal may alternatively recognize the text from the voice of the first user, and then send the recognized text to the mobile terminal.

The mobile terminal performs intention recognition on the recognized text, and recognizes that the first user wants to report a violation event. Further, when determining that the camera of the in-vehicle terminal (or the camera externally connected to the in-vehicle terminal) needs to be invoked to capture an image, the mobile terminal may automatically send an image capture command (which may be specifically a command for an image of the front/the right side/the left side of the vehicle) to the in-vehicle terminal. In an example, after receiving the image capture command, the in-vehicle terminal determines to invoke a specific camera (a camera for shooting the front/the right side/the left side of the vehicle) of the in-vehicle terminal to capture an image, to obtain the photo/video, and returns the photo/video to the mobile terminal. In some other examples, after receiving the image capture command, the in-vehicle terminal may alternatively invoke a plurality of cameras of the in-vehicle terminal to capture images, to obtain a plurality of photos/videos, and return the plurality of photos/videos to the mobile terminal. Then, the mobile terminal selects a specific photo/video from the plurality of photos/videos based on the intention of the first user.

In other words, when the voice of the first user includes orientation information, the mobile terminal may further determine to invoke a camera of the in-vehicle terminal corresponding to the orientation information to capture an image, or select an image corresponding to the orientation information from a plurality of images captured by the plurality of cameras of the in-vehicle terminal, to obtain the specific photo/video.

After obtaining the specific photo/video, the mobile terminal performs image analysis on the photo/video to determine whether a violation event exists. For example, the mobile terminal analyzes a vehicle speed, a vehicle location, a road indication line, a traffic light status, a driver status, and the like in the photo/video, to determine whether a violation of a vehicle or a driver exists in the photo/video.

Figure 10:
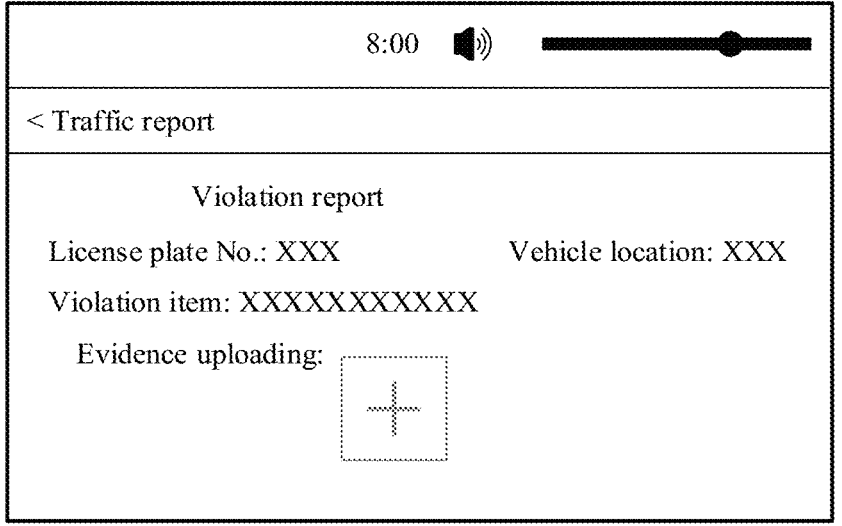
FIG. 10 is a schematic diagram of a process of another method for interaction between an in-vehicle terminal and a mobile terminal according to an embodiment of this disclosure.

When it is determined that the violation of the vehicle or the driver exists (in other words, a violation event is determined), the mobile terminal determines to invoke the traffic reporting software to report the violation event. The mobile terminal may upload the taken photo/video to the traffic reporting software, and the mobile terminal may further extract a license plate number of the vehicle, a location of the vehicle, a determined violated legal term, and the like, and report them to the traffic reporting software. Optionally, the mobile terminal may further add watermarks such as a shooting date and time and a shooting location to the photo/video. Similarly, after the reporting, the mobile terminal may notify the in-vehicle terminal, and the in-vehicle terminal displays a prompt or plays voice to notify the first user. For example, the in-vehicle terminal may display a violation reporting interface shown in FIG. 10.

When it is determined that no violation of the vehicle or the driver exists (in other words, no violation event is determined), the mobile terminal determines not to invoke the traffic reporting software to report, and may display prompt information or play voice by using the in-vehicle terminal, and notify the first user that no violation event exists.

Application scenario 5: A hardware parameter or a parameter set (namely, a hardware parameter or a parameter set of the in-vehicle terminal) of the vehicle is shared.

The mobile terminal establishes a communication connection to the in-vehicle terminal.

When the first user wants to share the hardware parameter or the parameter set of the vehicle with a friend, the first user may say "sending the first hardware parameter (or the parameter set) of the vehicle to Jack". After collecting voice of the first user, the microphone of the in-vehicle terminal sends the voice of the first user to the mobile terminal. The mobile terminal performs voice recognition on the voice of the first user, and recognizes a corresponding text. Alternatively, when the voice recognition software is configured on the in-vehicle terminal, the in-vehicle terminal may recognize the text from the voice of the first user, and then send the recognized text to the mobile terminal. The first hardware parameter or the parameter set of the vehicle includes one or more of a mode of an air conditioner, a temperature of the air conditioner, a control parameter of an atmosphere light, and a setting parameter of a car audio. In some examples, a setting application, the HiCar application, or a voice assistant application of the in-vehicle terminal may store the first hardware parameter or the parameter set.

The mobile terminal performs intention recognition on the recognized text, and recognizes that the first user wants to send the first hardware parameter or the parameter set to the friend. Further, when determining that the setting application (or the HiCar application or the voice assistant application) of the in-vehicle terminal needs to be invoked, the mobile terminal may automatically send a hardware parameter collection command to the in-vehicle terminal. After receiving the hardware parameter collection command, the in-vehicle terminal invokes the setting application (or the HiCar application or the voice assistant application) of the in-vehicle terminal to obtain a value of the first hardware parameter or the parameter set, and then returns the value to the mobile terminal.

After obtaining the first hardware parameter or the parameter set, the mobile terminal invokes the communication software (such as an SMS message, WeChat®, or QQ®) of the mobile terminal to send the first hardware parameter or the parameter set to Jack. In this way, Jack may set a parameter of corresponding hardware in the vehicle of Jack based on the value of the first hardware parameter or the parameter set.

Similarly, after sending the first hardware parameter or the parameter set, the mobile terminal may notify the in-vehicle terminal, and the in-vehicle terminal displays a prompt or plays voice to notify the first user.

In this embodiment of this disclosure, functional module division may be performed on the receiving device and the sending device based on the foregoing method embodiment. For example, each functional module may be divided based on each function, or two or more functions may be integrated in one processing module. The integrated module may be implemented in a form of hardware, or may be implemented in a form of a software functional module. It should be noted that, in this embodiment of this disclosure, division into the modules is an example, and is merely logical function division. During actual implementation, another division manner may be used.

Figure 11:
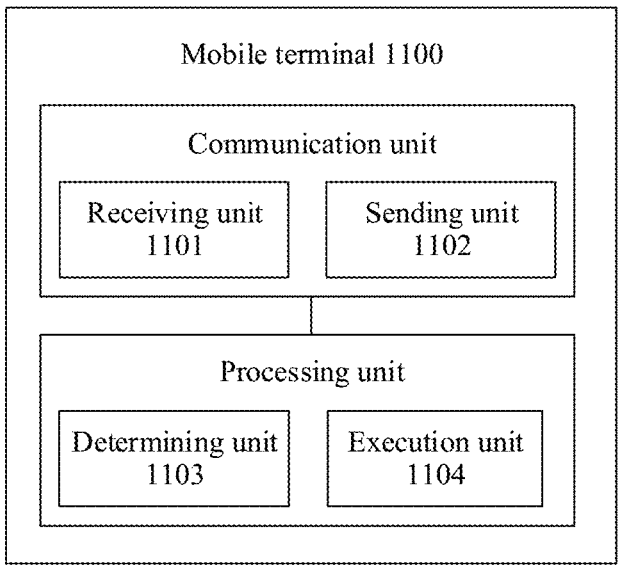
FIG. 11 is a schematic diagram of a structure of another mobile terminal according to an embodiment of this disclosure.

FIG. 11 is a schematic diagram of a composition of a mobile terminal according to an embodiment of this disclosure. As shown in FIG. 11, the mobile terminal 1100 may include a receiving unit 1101, a sending unit 1102, a determining unit 1103, and an execution unit 1104.

The receiving unit 1101 is configured to receive first information sent by an in-vehicle terminal, as shown in S602 in the foregoing method embodiment. The first information is determined based on a first input of a user received by the in-vehicle terminal, and indicates to execute a first function. The determining unit 1103 is configured to determine a first indication based on the first information. The sending unit 102 is configured to send the first indication to the in-vehicle terminal, where the first indication indicates the in-vehicle terminal to obtain second information, as shown in S603 in the foregoing embodiment. The receiving unit 1101 is further configured to receive the second information sent by the in-vehicle terminal, as shown in S604 in the foregoing embodiment. The execution unit 1104 is configured to execute the first function based on the second information, as shown in S605 in the foregoing embodiment.

Functions of the determining unit 1103 and the execution unit 1104 may be integrated into one unit, for example, a processing unit.

Functions of the receiving unit 1101 and the sending unit 1102 may be integrated into one unit, for example, a communication unit.

Certainly, the unit modules in the mobile terminal include but are not limited to the receiving unit 1101, the sending unit 1102, the determining unit 1103, and the execution unit 1104. For example, the mobile terminal may further include a storage unit (for example, the memory 120 in FIG. 2), and the like.

In addition, when the functions the determining unit 1103 and the execution unit 1104 are integrated into one unit, for example, the processing unit, the processing unit is one or more processors (for example, the processor 110 shown in FIG. 2). The one or more processors, the memory, the mobile communication module, and the like may be connected together, for example, through a bus. The memory is configured to store computer program code, where the computer program code includes instructions. When the processor executes the instructions, the mobile terminal may perform related method steps in the foregoing embodiment to implement the method in the foregoing embodiment. When the functions of the receiving unit 1101 and the sending unit 1102 are integrated into one unit, for example, the communication unit, the communication unit may be a wireless communication unit (for example, the wireless communication module 150 shown in FIG. 2) or a wired communication unit (for example, the USB interface 130 shown in FIG. 2).

Figure 12:
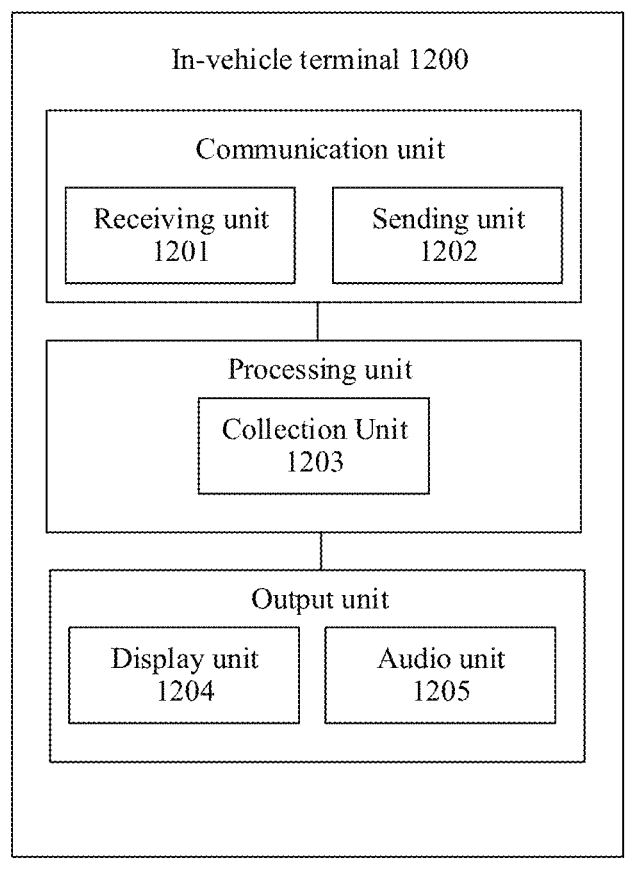
FIG. 12 is a schematic diagram of a structure of another in-vehicle terminal according to an embodiment of this disclosure.

FIG. 12 is a schematic diagram of a composition of an in-vehicle terminal according to an embodiment of this disclosure. As shown in FIG. 12, the in-vehicle terminal 1200 may include a receiving unit 1201, a sending unit 1202, a collection unit 1203, and an output unit (for example, including a display unit 1204 or an audio unit 1205).

The receiving unit 1201 is configured to receive a first input of a first user, where the first input indicates to execute a first function, as shown in S601 in the foregoing embodiment. The first input may be an operation of the first user on a corresponding control on a display (usually a touchscreen) of the in-vehicle terminal, or may be an operation on a corresponding physical button (for example, a button on a steering wheel), or may be voice input by the first user, or may be an air gesture operation of the first user, or the like. The sending unit 1202 is configured to send first information corresponding to the first input to a mobile terminal, as shown in S602 in the foregoing embodiment. The receiving unit 1201 is further configured to receive a first indication sent by the mobile terminal, as shown in S603 in the foregoing embodiment, where the first indication is an indication that is determined by the mobile terminal based on the first information and that needs the in-vehicle terminal to collect second information. The collection unit 1203 is configured to invoke, based on the first indication, software and hardware apparatuses of the in-vehicle terminal to collect the second information, as shown in S604 in the foregoing embodiment. The sending unit 1202 is configured to send the second information to the mobile terminal, as shown in S604 in the foregoing embodiment. The receiving unit 1201 is further configured to receive an execution result of the first function sent by the mobile terminal, as shown in S606 in the foregoing embodiment. The display unit 1204 is configured to display the execution result of the first function. Alternatively, the audio unit 1205 is configured to play the execution result of the first function.

Certainly, the unit modules in the in-vehicle terminal include but are not limited to the receiving unit 1201, the sending unit 1202, the collection unit 1203, and the display unit 1204 (or the audio unit 1205). For example, the in-vehicle terminal may further include a storage unit (for example, the memory 220 in FIG. 3), and the like. Functions of the receiving unit 1201 and the sending unit 1202 may be integrated into one unit, for example, a communication unit. The communication unit may be a wireless communication unit (for example, the wireless communication module 230 shown in FIG. 3) or a wired communication unit (for example, the USB interface 280 shown in FIG. 3). In addition, the collection unit 1203 may alternatively be referred to as a processing unit, and the processing unit is one or more processors (for example, the processor 210 shown in FIG. 3). The display unit 1204 may be a display (for example, the display 260 shown in FIG. 3). The audio unit 1205 may be a speaker or a car audio (for example, the speaker 240 shown in FIG. 3). The one or more processors, the memory, the mobile communication module, the display, the speaker, and the like may be connected together, for example, through a bus. The memory is configured to store computer program code, where the computer program code includes instructions. When the processor executes the instructions, an electronic device may perform related method steps in the foregoing embodiment to implement the method in the foregoing embodiment.

An embodiment of this disclosure further provides a computer-readable storage medium. The computer-readable storage medium stores computer software instructions. When the computer software instructions run in an information processing apparatus, the information processing apparatus may perform related method steps in the foregoing embodiment to implement the method in the foregoing embodiment.

An embodiment of this disclosure further provides a computer program product. When the computer program product runs on a computer, the computer is enabled to perform related method steps in the foregoing embodiment to implement the method in the foregoing embodiment.

The in-vehicle terminal, the mobile terminal, the computer storage medium, and the computer program product provided in embodiments of this disclosure each are configured to perform the corresponding method provided above. Therefore, for beneficial effects that can be achieved by the in-vehicle terminal, the mobile terminal, the computer storage medium, and the computer program product, refer to the beneficial effects in the corresponding method provided above. Details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this disclosure, it should be understood that the disclosed apparatus and method may be implemented in other manners. For example, the described apparatus embodiment is merely an example. For example, module or unit division is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, in other words, may be located in one position, or may be distributed on a plurality of different positions. Some or all of the units may be selected based on actual requirements to achieve the objective of the solutions of embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiment of this disclosure essentially, or the part contributing to the conventional technology, or all or some of the technical solutions may be implemented in a form of a software product. The software product is stored in a storage medium, and includes several instructions for instructing a device (which may be a single-chip microcomputer, a chip or the like) or a processor to perform all or some of the steps of the methods described in embodiments of this disclosure The foregoing storage medium includes various media that can store program code, such as a USB flash drive, a removable hard disk, a read-only memory (ROM), a random access memory (RAM), a magnetic disk, or an optical disc.

The foregoing descriptions are merely specific embodiments of this disclosure, but are not intended to limit the protection scope of this disclosure.

What is claimed is:

1. A method for interaction between a mobile terminal and an in-vehicle terminal, applied to the mobile terminal, wherein the mobile terminal establishes a communication connection to the in-vehicle terminal, and the method comprises:

receiving, by the mobile terminal, first information sent by the in-vehicle terminal, wherein the first information which includes a user command indicates to execute a first function;

determining, by the mobile terminal, a first indication based on the first information, and sending the first indication to the in-vehicle terminal, including:

automatically analyzing the user command and automatically determining, by the mobile terminal based on orientation information in the first information, a camera of the in-vehicle terminal corresponding to the orientation information, and instructing the camera via an electronic signal to take a photo or a video, wherein the orientation information is user-specified which is indicated by a voice of a first user;

wherein the first indication indicates the in-vehicle terminal to obtain second information;

receiving, by the mobile terminal, the second information sent by the in-vehicle terminal; and executing, by the mobile terminal, the first function based on the second information.

2. The method according to claim 1, wherein after executing the first function based on the second information, the method further comprises:

sending, by the mobile terminal, an execution result of the first function to the in-vehicle terminal.

3. The method according to claim 1, wherein the determining the first indication based on the first information comprises:

recognizing, by the mobile terminal, an intention corresponding to the first information;

determining, by the mobile terminal, the second information based on the intention, wherein the second information is information that needs to be obtained by the in-vehicle terminal; and determining, by the mobile terminal, the first indication based on the second information.

4. The method according to claim 1, wherein the first information indicates to send location information of the first user, the second information is location information of the in-vehicle terminal, and the first indication indicates to invoke a positioning apparatus of the in-vehicle terminal to obtain the location information of the in-vehicle terminal, or invoke positioning software of the in-vehicle terminal to obtain the location information of the in-vehicle terminal; and wherein the executing the first function based on the second information comprises:

invoking, by the mobile terminal, communication software of the mobile terminal to send the location information of the in-vehicle terminal to a terminal of a second user.

5. The method according to claim 1, wherein the first information indicates to share the photo or the video, the second information is the photo or the video taken by the in-vehicle terminal, and the first indication indicates to invoke the camera of the in-vehicle terminal to take the photo or the video; and wherein the executing the first function based on the second information comprises:

invoking, by the mobile terminal, communication software or short video software of the mobile terminal to share the photo or the video taken by the camera of the in-vehicle terminal.

6. The method according to claim 5, wherein based on the in-vehicle terminal comprising a plurality of cameras, the executing, by the mobile terminal, the first function based on the second information further comprises:

clipping, by the mobile terminal, photos or videos captured by the plurality of cameras of the in-vehicle terminal, and sharing a clipped photo or video by using the communication software or the short video software of the mobile terminal.

7. The method according to claim 1, wherein the first information indicates to report a violation, and the method further comprises:

determining, by the mobile terminal, based on the photo or the video taken by the camera of the in-vehicle terminal, whether a violation event exists;

based on determining that the violation event exists, invoking traffic reporting software of the mobile terminal to report the violation event; and based on determining that no violation event exists, sending a message to the in-vehicle terminal, wherein the message notifies that no violation event exists.

8. A mobile terminal, comprising a processor, a memory, and a display, wherein the memory and the display are coupled to the processor, the memory is configured to store computer program code, the computer program code comprises computer instructions, which upon execution by the processor, cause the mobile terminal to perform operations including:

receiving first information sent by an in-vehicle terminal, wherein the first information which includes a user command indicates to execute a first function;

determining a first indication based on the first information, and sending the first indication to the in-vehicle terminal, including:

automatically analyzing the user command and automatically determining, by the mobile terminal based on orientation information in the first information, a camera of the in-vehicle terminal corresponding to the orientation information, and instructing the camera via an electronic signal to take a photo or a video, wherein the orientation information is user-specified which is indicated by a voice of a first user;

wherein the first indication indicates the in-vehicle terminal to obtain second information;

receiving the second information sent by the in-vehicle terminal; and executing the first function based on the second information.

9. The mobile terminal according to claim 8, wherein the operations further comprise:

after performing the first function based on the second information, sending an execution result of the first function to the in-vehicle terminal.

10. The mobile terminal according to claim 8, wherein the operation of determining the first indication based on the first information comprises:

recognizing an intention corresponding to the first information;

determining the second information based on the intention, wherein the second information is information that needs to be obtained by the in-vehicle terminal; and determining the first indication based on the second information.

11. The mobile terminal according to claim 8, wherein the first information indicates to send location information of the first user, the second information is location information of the in-vehicle terminal, and the first indication indicates to invoke a positioning apparatus of the in-vehicle terminal to obtain the location information of the in-vehicle terminal, or invoke positioning software of the in-vehicle terminal to obtain the location information of the in-vehicle terminal; and wherein the operation of executing the first function based on the second information comprises:

invoking communication software of the mobile terminal to send the location information of the in-vehicle terminal to a terminal of a second user.

12. The mobile terminal according to claim 8, wherein the first information indicates to share the photo or the video, the second information is the photo or the video taken by the in-vehicle terminal, and the first indication indicates to invoke the camera of the in-vehicle terminal to take the photo or the video; and wherein the operation of executing the first function based on the second information comprises:

invoking communication software or short video software of the mobile terminal to share the photo or the video taken by the camera of the in-vehicle terminal.

13. The mobile terminal according to claim 12, wherein based on the in-vehicle terminal comprising a plurality of cameras, the operation of executing the first function based on the second information further comprises:

clipping photos or videos captured by the plurality of cameras of the in-vehicle terminal, and sharing a clipped photo or video by using the communication software or the short video software of the mobile terminal.

14. The mobile terminal according to claim 8, wherein the first information indicates to report a violation, and the operations further comprise:

determining, based on the photo or the video taken by the camera of the in-vehicle terminal, whether a violation event exists;

based on determining that the violation event exists, invoking traffic reporting software of the mobile terminal to report the violation event; and based on determining that no violation event exists, sending a message to the in-vehicle terminal, wherein the message notifies that no violation event exists.

15. A non-transitory computer-readable storage medium, comprising computer instructions, wherein upon the computer instructions being run on a mobile terminal, the mobile terminal is enabled to perform operations including:

receiving, first information sent by an in-vehicle terminal, wherein the first information which includes a user command indicates to execute a first function;

determining, a first indication based on the first information, and sending the first indication to the in-vehicle terminal, including:

automatically analyzing the user command and automatically determining, by the mobile terminal based on orientation information in the first information, a camera of the in-vehicle terminal corresponding to the orientation information, and instructing the camera via an electronic signal to take a photo or a video, wherein the orientation information is user-specified which is indicated by a voice of a first user;

wherein the first indication indicates the in-vehicle terminal to obtain second information;

receiving, the second information sent by the in-vehicle terminal; and executing, the first function based on the second information.

16. The non-transitory computer-readable storage medium according to claim 15, wherein the operations further comprise:

sending, by the mobile terminal, an execution result of the first function to the in-vehicle terminal.

17. The non-transitory computer-readable storage medium according to claim 15, wherein the operation of determining the first indication based on the first information comprises:

recognizing, an intention corresponding to the first information;

determining, the second information based on the intention, wherein the second information is information that needs to be obtained by the in-vehicle terminal; and determining, the first indication based on the second information.

18. The non-transitory computer-readable storage medium according to claim 15, wherein the first information indicates to send location information of the first user, the second information is location information of the in-vehicle terminal, and the first indication indicates to invoke a positioning apparatus of the in-vehicle terminal to obtain the location information of the in-vehicle terminal, or invoke positioning software of the in-vehicle terminal to obtain the location information of the in-vehicle terminal; and wherein the operation of executing the first function based on the second information comprises:

invoking, communication software of the mobile terminal to send the location information of the in-vehicle terminal to a terminal of a second user.

19. The non-transitory computer-readable storage medium according to claim 15, wherein the first information indicates to share the photo or the video, the second information is the photo or the video taken by the in-vehicle terminal, and the first indication indicates to invoke the camera of the in-vehicle terminal to take the photo or the video; and wherein the operation of executing the first function based on the second information comprises:

invoking, communication software or short video software of the mobile terminal to share the photo or the video taken by the camera of the in-vehicle terminal.

20. The non-transitory computer-readable storage medium according to claim 15, wherein the first information indicates to report a violation, and the operations further comprise:

determining, based on the photo or the video taken by the camera of the in-vehicle terminal, whether a violation event exists;

based on determining that the violation event exists, invoking traffic reporting software of the mobile terminal to report the violation event; and based on determining that no violation event exists, sending a message to the in-vehicle terminal, wherein the message notifies that no violation event exists.

* * * * *